(12) United States Patent
Shibata

(10) Patent No.: US 11,277,536 B2
(45) Date of Patent: Mar. 15, 2022

(54) IMAGE READING APPARATUS, METHOD OF CONTROLLING IMAGE READING APPARATUS, AND STORAGE MEDIUM

(71) Applicant: CANON KABUSHIKI KAISHA, Tokyo (JP)

(72) Inventor: Daisuke Shibata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/742,767

(22) Filed: Jan. 14, 2020

(65) Prior Publication Data
US 2020/0236238 A1 Jul. 23, 2020

(30) Foreign Application Priority Data

Jan. 17, 2019 (JP) .............................. JP2019-006204

(51) Int. Cl.
*H04N 1/00* (2006.01)

(52) U.S. Cl.
CPC ..... *H04N 1/00779* (2013.01); *H04N 1/00588* (2013.01); *H04N 1/00716* (2013.01)

(58) Field of Classification Search
CPC ............ B65H 2220/01; B65H 2220/03; B65H 2511/13; B65H 2511/524; B65H 2515/34; B65H 2511/11; B65H 2515/70; B65H 2515/708; B65H 2220/02; B65H 2553/21; B65H 2701/1912; B65H 7/12; B65H 2404/1341; B65H 2404/18; B65H 2404/185; B65H 2404/186; B65H 27/00; B65H 3/5238; H04N 1/00588; H04N 1/00716; H04N 1/00694; H04N 1/00779; H04N 1/00408; H04N 1/00477; H04N 1/00506; H04N 1/00631; H04N 1/00663; H04N 1/00689; H04N 1/00758;
(Continued)

(56) References Cited

U.S. PATENT DOCUMENTS

| 5,458,324 | A | * | 10/1995 | Nakamura | ................ B65H 7/12 |
| | | | | | 271/10.02 |
| 5,499,807 | A | * | 3/1996 | Nakamura | ........... B65H 3/5238 |
| | | | | | 271/121 |

(Continued)

FOREIGN PATENT DOCUMENTS

JP 6-24604 A 2/1994

*Primary Examiner* — Negussie Worku
(74) *Attorney, Agent, or Firm* — Canon U.S.A., Inc. IP Division

(57) ABSTRACT

An image reading apparatus configured to cause a document placed on a document tray to be conveyed based on information about a thickness of the document includes a detector configured to detect the document placed on the document tray, a display device configured to display an object for setting the thickness of the document when the detector detects the document placed on the document tray, a sheet conveyance controller configured to cause a sheet conveyance device to convey the document based on information about the thickness of the document set by the object displayed by the display device, and a reader configured to read an image of the document conveyed by the sheet conveyance device, wherein the image reading apparatus receives a setting as to whether a screen for setting the thickness of the document is to be displayed when the detector detects the placed document.

24 Claims, 15 Drawing Sheets

(58) Field of Classification Search
CPC ........... H04N 1/00771; H04N 1/00793; H04N 1/00795; H04N 1/3263; H04N 1/32657; G03G 2215/0035
USPC .................................. 358/513, 514, 474, 498
See application file for complete search history.

(56) References Cited

U.S. PATENT DOCUMENTS

| | | | |
|---|---|---|---|
| 5,721,627 A * | 2/1998 | Kamiya | H04N 1/00352 |
| | | | 358/496 |
| 10,095,146 B2 * | 10/2018 | Yamada | H04N 1/29 |
| 10,585,380 B2 * | 3/2020 | Kimpara | G03G 15/5037 |
| 10,962,913 B2 * | 3/2021 | Kawabata | G03G 15/6555 |
| 2006/0216048 A1 * | 9/2006 | Fujii | G03G 15/5029 |
| | | | 399/45 |
| 2012/0013955 A1 * | 1/2012 | Ikeda | H04N 1/203 |
| | | | 358/461 |
| 2015/0281492 A1 * | 10/2015 | Mamura | H04N 1/00726 |
| | | | 358/1.15 |
| 2017/0075278 A1 * | 3/2017 | Yoshimura | G03G 15/607 |
| 2017/0336748 A1 * | 11/2017 | Maejima | G03G 15/6514 |
| 2018/0232620 A1 * | 8/2018 | Yoshimura | G07D 7/121 |
| 2018/0335718 A1 * | 11/2018 | Chikugo | G03G 15/087 |
| 2019/0212684 A1 * | 7/2019 | Watanabe | G03G 15/5016 |
| 2019/0227426 A1 * | 7/2019 | Hayamizu | H04N 1/00681 |
| 2020/0104656 A1 * | 4/2020 | Akatsu | G03G 15/6514 |
| 2020/0130971 A1 * | 4/2020 | Kawabata | B65H 7/02 |
| 2020/0137259 A1 * | 4/2020 | Totsuka | H04N 1/00578 |
| 2020/0137261 A1 * | 4/2020 | Hirao | H04N 1/32683 |
| 2020/0213460 A1 * | 7/2020 | Naito | H04N 1/00408 |
| 2020/0234980 A1 * | 7/2020 | Hanawa | F26B 5/06 |
| 2020/0236234 A1 * | 7/2020 | Suetani | H04N 1/00793 |
| 2020/0412893 A1 * | 12/2020 | Yamamoto | H04N 1/00689 |
| 2021/0048770 A1 * | 2/2021 | Kawabata | G03G 15/5029 |
| 2021/0048771 A1 * | 2/2021 | Kawabata | G03G 15/6594 |

* cited by examiner

FIG.7

| APPARATUS SETTING | |
|---|---|
| SHEET THICKNESS SELECTION METHOD SETTING | FIXED SETTING |
| SHEET THICKNESS FIXED SETTING | THICK SHEET |
| SHEET THICKNESS DESIGNATION SETTING | — |
| .... | .... |

| COPY SETTING | |
|---|---|
| SHEET THICKNESS SETTING | THICK SHEET |
| PAGE NUMBER PRINTING | ENABLED |
| N-IN-ONE PRINTING | DISABLED |
| BINDING | DISABLED |
| NUMBER OF COPIES | 5 |
| .... | .... |

# IMAGE READING APPARATUS, METHOD OF CONTROLLING IMAGE READING APPARATUS, AND STORAGE MEDIUM

BACKGROUND

Field

The present disclosure relates to an image reading apparatus that controls conveyance of a document based on the thickness of the document, a method of controlling the image reading apparatus, and a storage medium.

Description of the Related Art

In a case where a document to be read by an automatic document conveyance apparatus is a thick sheet, a load on a conveyance roller increases at a curved portion of a conveyance path, so that a jam often occurs at the curved portion. Further, in a case where a document is a thin sheet, it takes time for the discharged document to completely drop onto a sheet discharge portion due to the light weight of the document, so that the trailing edge of the document and the leading edge of a next document hit each other, causing a jam or a stacking trouble.

In view of the above-described issue, Japanese Patent Application Laid-Open No. 6-24604 discusses a conventional automatic document conveyance apparatus that prompts a user to select from a thin sheet, a thick sheet, and a normal sheet, or detects a sheet thickness and changes a document conveyance speed according to the detected sheet thickness.

In order to automatically detect a sheet thickness, a sensor needs to be added to the automatic document conveyance apparatus, and such addition of the sensor increases the costs.

SUMMARY

Japanese Patent Application No. 2018-204139 discusses a technique in which as a user places a document while a copy screen is displayed, a document thickness selection screen is displayed to receive a document thickness from the user. In this way, the thickness of the document can be recognized without using a sensor.

However, it has now been determined that with the related art, there are cases where the thickness of a document to be read by the image reading apparatus is predetermined depending on the type of work.

If the document thickness selection screen is automatically displayed each time a document is placed on the automatic document conveyance apparatus even in the above-described cases, the user needs to set a document thickness setting each time, which increases user's time and labor.

According to an aspect of the present disclosure, an image reading apparatus configured to cause a document placed on a document tray to be conveyed based on information about a thickness of the document includes a detector configured to detect the document placed on the document tray, a display device configured to display an object for setting the thickness of the document when the detector detects the document placed on the document tray, a sheet conveyance controller configured to cause a sheet conveyance device to convey the document based on information about the thickness of the document that is set by the object displayed by the display device, and a reader configured to read an image of the document conveyed by the sheet conveyance device, wherein a user is prompted to make a setting as to whether a screen for setting the thickness of the document is to be displayed when the detector detects the placed document.

Further features of the present disclosure will become apparent from the following description of exemplary embodiments with reference to the attached drawings.

BRIEF DESCRIPTION OF THE DRAWINGS

FIG. 7 illustrates a setting value structure stored in a random access memory (RAM).

DESCRIPTION OF THE EMBODIMENTS

Various exemplary embodiments of the present disclosure will be described below with reference to the drawings.

Figure 1:
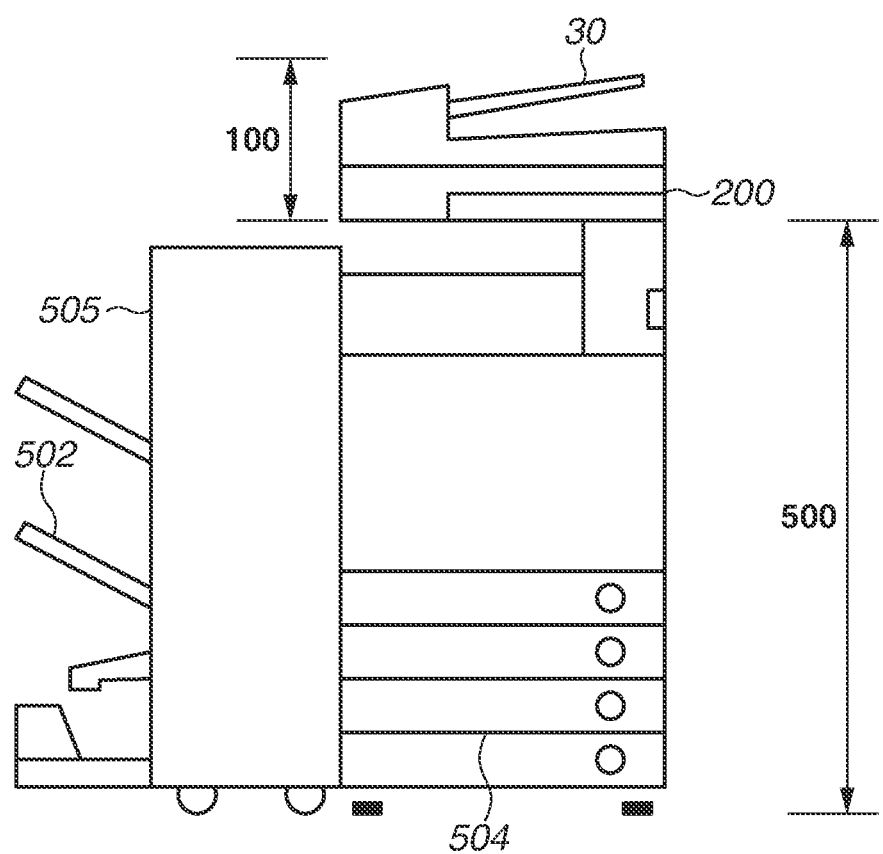
FIG. 1 illustrates an example of an exterior of an image forming apparatus according to an exemplary embodiment of the present disclosure.

A first exemplary embodiment will be described below. FIG. 1 illustrates an example of an exterior of an image forming apparatus that is an example of an image reading apparatus.

The image forming apparatus according to the present exemplary embodiment includes an image reading unit 200 and an image forming unit 500.

The image reading unit 200 inputs reflection light acquired by exposing and scanning an image on a document with light emitted from an illumination lamp to a linear image sensor (charge-coupled device (CCD) sensor) to convert information about the image into an electric signal. The image reading unit 200 further converts the electric signal into luminance signals of red (R), green (G), and blue (B) and outputs the luminance signals as image data to a controller of the image forming apparatus.

Documents are set on a document tray 30 of an automatic document feeding unit (hereinafter, ADF) 100. If a user inputs an instruction to execute reading processing via an operation unit of the image forming apparatus, the controller of the image forming apparatus transmits a document reading instruction to the image reading unit 200. If the image reading unit 200 receives the instruction, the documents are fed one by one from the document tray 30 of the ADF 100 to read each document. Further, the user can place a document on a platen glass described below to read the document.

The image forming unit 500 is an image forming device that forms image data received from a controller 400 on a sheet.

An image forming method according to the present exemplary embodiment is an electrophotographic method using a photosensitive drum or photosensitive belt. Further, the image forming unit 500 includes a plurality of cassettes that can store sheets of different sizes or different orientations as a sheet feeding unit 504. Further, a printed sheet is discharged to a sheet discharge unit 502. A finisher unit 505 performs post-processing, such as stapling processing and punching processing, on the sheet based on a user setting.

Figure 2:
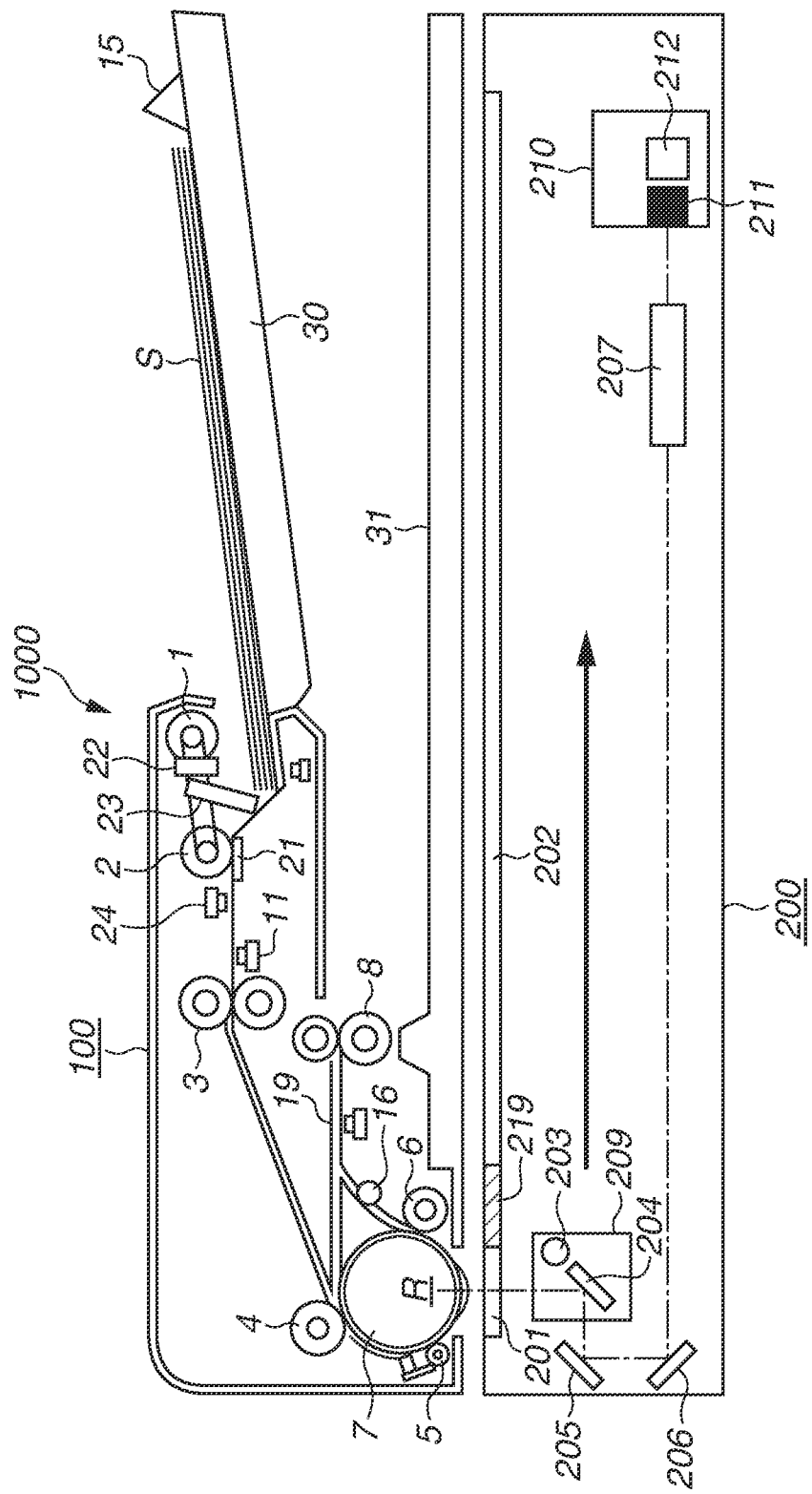
FIG. 2 is a cross-sectional view schematically illustrating an example of a configuration of an automatic document feeding unit (ADF) and an image reading unit according to an exemplary embodiment of the present disclosure.

FIG. 2 is a cross-sectional view schematically illustrating an example of a configuration of the ADF 100 and the image reading unit 200 according to the present exemplary embodiment.

An operation of the ADF 100 will be described below with reference to FIG. 2. In FIG. 2, the ADF 100 includes the document tray 30, a separation pad 21, and a sheet feeding roller 1. A document stack S of one or more document sheets is stacked on the document tray 30. The separation pad 21 regulates the document stack S to prevent the document stack S from moving downstream from the document tray 30 before document conveyance is started. The ADF 100 further includes a document detection sensor 23, a ranging sensor 22, and a separation sensor 24. The document detection sensor 23 detects a document S placed on the document tray 30. The ranging sensor 22 measures the distance to an uppermost surface of the document stack S. The separation sensor 24 detects passing of a document S through a separation roller 2. The document detection sensor 23 can be provided to be under a document to detect the document placed thereon. The sheet feeding roller 1 is moved down onto the uppermost surface of the document stack S stacked on the document tray 30 and is rotated thereon. Consequently, the uppermost document of the document stack S is fed. The documents conveyed by the sheet feeding roller 1 are separated one by one by an action of the separation roller 2 and the separation pad 21. The separation is realized by a well-known retard/separation technique. At this time, if the separation sensor 24 does not detect a document after a predetermined amount of time (a) passes since the start of the document conveyance, the driving of the sheet feeding roller 1 is stopped. The predetermined amount of time (a) until the stop of the sheet feeding roller 1 is a sufficient amount of time that takes into consideration a predicted amount of time from a start of the document conveyance to an arrival at the separation sensor 24 that is predicted based on a conveyance speed, and a delay time.

The document separated by the separation roller 2 and separation pad 21 is conveyed toward a registration roller 4 by the conveyance roller 3 and is struck on the registration roller 4. Consequently, the document is formed into a loop, and skew feed that occurs while the document is conveyed is solved. A sheet feeding path through which the document having passed through the registration roller 4 is conveyed toward a skim glass 201 is provided downstream of the registration roller 4.

The document conveyed to the sheet feeding path is conveyed onto a platen by a large roller 7 and a conveyance roller 5. At this time, the large roller 7 touches the skim glass 201. The document conveyed by the large roller 7 passes through a conveyance roller 6, is moved between a roller 16 and a moving glass, and is discharged onto a document discharge tray 31 via a sheet discharge flapper and a sheet discharge roller 8.

The ADF 100 in FIG. 2 is a type of apparatus configured to reverse a document to read an image on the back surface of the document. The ADF 100 moves the document to a reversing path 19 by reversing the rotation of the sheet discharge roller 8 and switching the sheet discharge flapper in a state where the sheet discharge roller 8 is nipping the document. The ADF 100 causes the document moving in the reversing path 19 to hit against the registration roller 4 to form the document into a loop again so that skew feed that occurs while the document is conveyed is solved. Thereafter, the ADF 100 moves the document to the skim glass 201 again using the conveyance roller 5 and the large roller 7 so that the skim glass 201 can read the image on the back surface of the document.

Further, the document tray 30 is provided with a guide regulation plate 15 and a document width detection sensor (not illustrated). The guide regulation plate 15 is slidable in a sub-scan direction in which sub-scanning is performed on the stacked document stack S. The document width detection sensor (not illustrated) detects a document width in conjunction with the guide regulation plate 15. The document size of the document stack S stacked on the document tray 30 can be identified by a combination of the document detection sensor 23 and a pre-registration sensor 11. Further, a document length detection sensor (not illustrated) provided in the conveyance path may detect a document length based on a conveyance distance from a point of detection of a leading edge of the document being conveyed to a point of detection of a trailing edge of the document. The document size can also be identified based on a combination of the detected document length and the document width detection sensor.

(Example of Configuration of Image Reading Unit 200)

An optical scanner unit 209 scans a document on a platen glass 202 in a sub-scan direction specified by an arrow in FIG. 2 so that the image reading unit 200 optically reads image information recorded on the document. Further, the image reading unit 200 controls the ADF 100 so that the documents on the document tray 30 are conveyed one by one to a reading position. Further, the image reading unit 200 moves the optical scanner unit 209 to a center of the reading position of the large roller 7 of the ADF 100, and the document is read at the reading position of the large roller 7. The document on the document tray 30 of the ADF 100 or the document on the platen glass 202 is read by the following optical system. This optical system includes the skim glass 201, the platen glass 202, a scanner unit 209 which includes a lamp 203 and a mirror 204, mirrors 205 and 206, a lens 207, and a CCD sensor unit 210. The read image information is photoelectrically converted, and the photo-electrically-converted image information is input as image data to a controller unit (not illustrated in FIG. 2). Further, a white board 219 is for use in generating reference data about a white level in shading.

In the present exemplary embodiment, the CCD sensor unit 210 includes a color image reading (RGB) CCD (three-line sensor unit) 212 and a monochrome image reading CCD (one-line sensor unit) 211.

In the present exemplary embodiment, the ADF 100 configured to reverse a document so that the image reading unit 200 reads an image on the back surface of the document is described as an example. Alternatively, the image reading unit 200 can include a document front-surface reading CCD and a document back-surface reading CCD so that both surfaces of a document are read when the document is conveyed once.

(Control Block of ADF 100)

Figure 3:
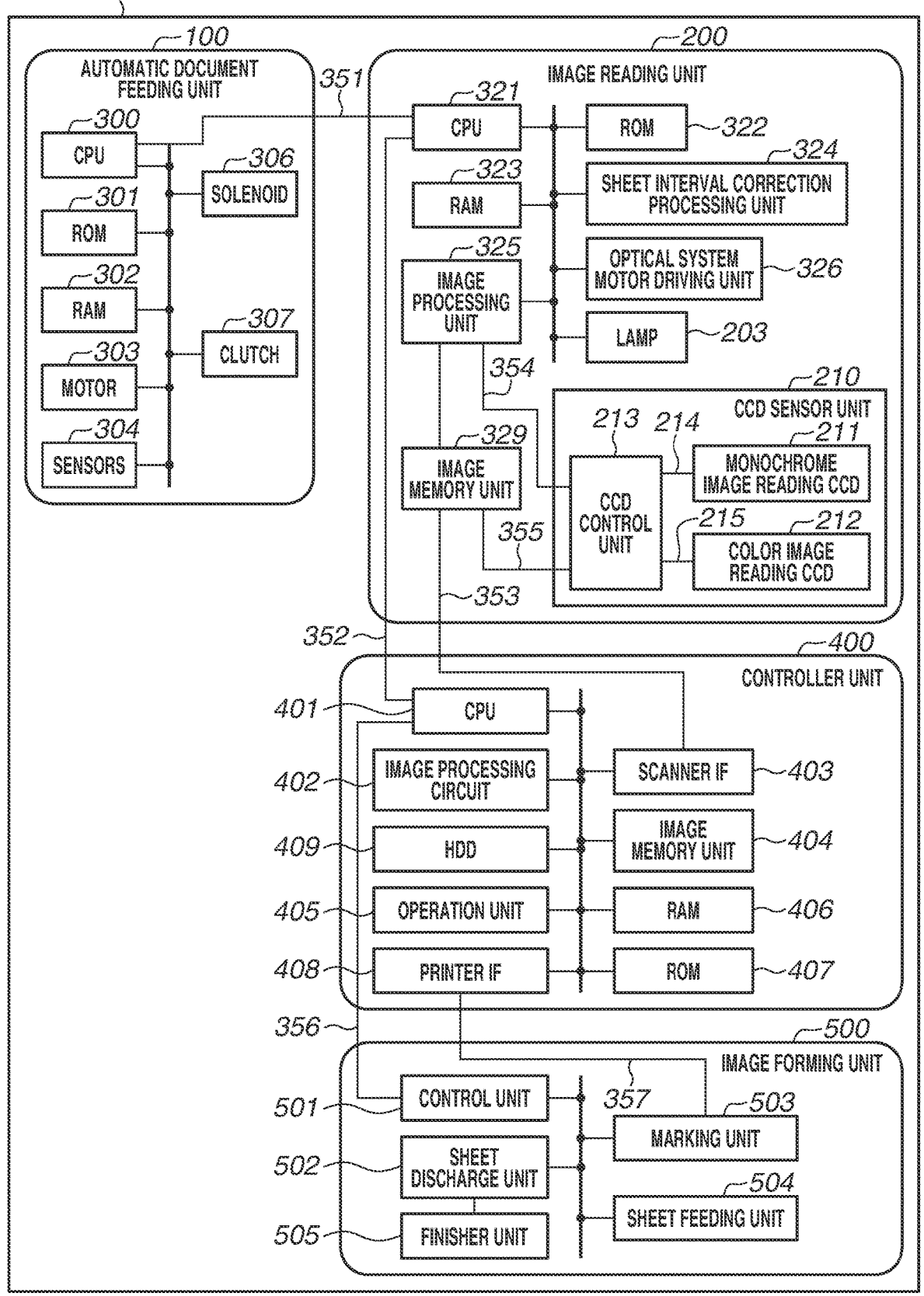
FIG. 3 is a block diagram illustrating a configuration of an image forming apparatus according to an exemplary embodiment of the present disclosure.

FIG. 3 is a block diagram illustrating a configuration of the image forming apparatus 1000 according to the present exemplary embodiment.

A control block of the ADF 100 includes a control unit (hereinafter, "CPU") 300, which is a central processing unit, a read-only memory (hereinafter, "ROM") 301, a random access memory (hereinafter, "RAM") 302, an output port, and an input port. A control program and a fixed parameter are stored in the ROM 301, and input data and work data are stored in the RAM 302.

The output port is connected to a motor 303 for driving various conveyance rollers, a solenoid 306, and a clutch 307. The input port is also connected to various sensors 304.

The CPU 300 controls sheet conveyance based on the control program stored in the ROM 301 connected via a bus line. The CPU 300 performs serial communication with a central processing unit (CPU) 321 of the image reading unit 200 via a control communication line 351 and exchanges control data with the image reading unit 200. Further, the image reading unit 200 is also notified of an image leading-edge signal as a reference for the leading edge of document image data via the control communication line 351.

Further, the CPU 300 notifies the image reading unit 200 of values of the various sensors 304 based on control data from the CPU 321 of the image reading unit 200.

(Control Block of Image Reading Unit 200)

In a control block of the image reading unit 200, the CPU 321 performs the entire control of the image reading unit 200. The CPU 321 is connected to a ROM 322 and a RAM 323. The ROM 322 stores a program, and a RAM 323 provides a work area. The RAM 323 indicates a work area that includes a non-volatile storage area.

An optical system motor driving unit 326 is a driver circuit configured to drive an optical system driving motor. The image reading unit 200 is connected to the lamp 203 and the CCD sensor unit 210 (monochrome image reading CCD 211 for front-surface image/color image reading CCD 212 for front-surface image). The CPU 321 performs image reading processing by controlling the optical system motor driving unit 326 and controlling the CCD sensor unit 210 via an image processing unit 325.

In order to realize sheet conveyance, the CPU 321 transmits a command for sheet conveyance control to the CPU 300 of the ADF 100 for sheet conveyance control via the control communication line 351 and instructs the CPU 300 to convey a sheet. Upon receipt of the instruction, the CPU 300 monitors the sensors 304 provided on the conveyance path and drives the motor 303 for conveyance, the solenoid 306, and the clutch 307, which serve as load, to realize sheet conveyance. In this way, the CPU 321 controls sheet conveyance performed by the ADF 100 and image reading performed by the image reading unit 200. A sheet interval correction processing unit 324 performs sheet interval correction.

An image signal formed on the CCD sensor unit 210 (one of the color image reading (RGB) CCD 212 and the monochrome image reading CCD 211) by the lens 207 is converted into digital image data. The image processing unit 325 performs various types of image processing, such as shading, on the converted image data to detect a streak image on the image data and correct the detected streak image, and the processed image data is written into an image memory unit 329.

The data written to the image memory unit 329 is sequentially transmitted to a controller unit 400 via a controller interface image data information communication line 353 including a clock signal line for image transfer. Further, a notification of the image leading-edge signal as a reference for the leading edge of the document image data is transmitted to the controller unit 400 via a controller interface control communication line 352 at a timing adjusted by the CPU 321. Similarly, a notification of the image leading-edge signal transmitted from the ADF 100 via the control communication line 351 is also transmitted to the controller unit 400 via the controller interface control communication line 352 at a timing adjusted by the CPU 321 of the image reading unit 200.

The CPU 321 controls the image processing unit 325 connected on a control bus line. The CPU 321 further controls the CCD sensor unit 210 by transmitting a control signal to the CCD sensor unit 210 via the image processing unit 325 using a control communication line 354. While the CCD sensor unit 210 scans a document image, the color image reading CCD 212 or the monochrome image reading CCD 211 reads the document image. Then, a read analog image signal of each line is output to a CCD control unit 213 via an image data communication line 214 or 215, which includes a clock signal line for image transfer.

The CCD control unit 213 converts the analog signal into digital image data. The digital image data is transmitted to the image memory unit 329 via an image data information communication line 355, which includes a clock signal line for image transfer, and then transmitted to the controller unit 400 via the image data information communication line 353.

The CPU 321 performs serial communication with a central processing unit (CPU) 401 of the controller unit 400 via the control communication line 354 and exchanges control data with the controller unit 400. The CPU 321 performs abnormal shape detection on a document being conveyed based on the control data from the central processing unit (CPU) 401 of the controller unit 400. In the abnormal shape detection, the CPU 321 calculates for each document the difference between the distance to the uppermost surface of the document S that is measured before a start of sheet conveyance and the distance to the uppermost surface of the document S that is measured after a predetermined amount of time (t2) from the start of sheet conveyance. If the calculated difference is greater than or equal to a predetermined level (d1), it is determined that the document is abnormal in shape. Then, the CPU 321 notifies the central processing unit (CPU) 401 of the controller unit 400 of the judgement result.

(Control Block of Controller Unit 400)

The controller unit 400 for image processing is an apparatus that controls the entire image forming apparatus 1000 including the ADF 100, the image reading unit 200, and the image forming unit 500. The controller unit 400 includes a CPU 401, an image processing circuit 402, a scanner interface (IF) 403, an image memory unit 404, an operation unit 405, a RAM 406, a ROM 407, a printer IF 408, and a hard disk drive (HDD) 409. The RAM 406 provides a work area, and the ROM 407 stores a program. The RAM 406 indicates a work area including a non-volatile storage area. The ROM 407 and the HDD 409 are examples of a computer-readable storage medium.

In an alternative configuration, a program is loaded from the HDD 409 onto the RAM 406, and the CPU 401 executes the loaded program.

The image data transmitted to the controller unit 400 via the image data information communication line 353 is stored in the image memory unit 404 via a scanner IF 403.

The image processing circuit 402 converts an image stored in the image memory unit 404 and returns the converted image to the image memory unit 404 again. The image conversion processing performed by the image processing circuit 402 includes rotation processing for rotating an image in units of 32×32 pixels at a designated angle, and resolution conversion processing for converting the resolution of an image. The image conversion processing performed by the image processing circuit 402 further includes scaling processing for scaling an image, a matrix operation on a multi-valued image, and color space conversion processing for converting a YUV image into a Lab image using a lookup table (LUT). The color space conversion includes a 3×8 matrix operation using a one-dimensional LUT, and known background removal and offset prevention can thus be performed.

The controller unit 400 includes a network interface (I/F) (not illustrated) and transmits and receives image data and other data to and from an external personal computer (PC).

(Control Block of Image Forming Unit 500)

The image forming unit 500 conveys a recording sheet (sheet), prints image data as a visible image on the recording sheet, and discharges the printed recording sheet to the outside of the apparatus. The image forming unit 500 includes a control unit 501, the sheet feeding unit 504, and a marking unit 503. The control unit 501 controls the image forming unit 500. The sheet feeding unit 504 includes a plurality of recording sheet cassettes storing a plurality of types of recording sheets. The marking unit 503 has a function of transferring image data onto a recording sheet and fixing the transferred image data to the recording sheet. The image forming unit 500 further includes the sheet discharge unit 502 and the finisher unit 505. The sheet discharge unit 502 has a function of outputting a printed recording sheet to the outside of the apparatus. the finisher unit 505 performs punching processing and sorting processing.

When the marking unit 503 is prepared for image forming, the control unit 501 transmits an image leading-edge signal, which is to be a reference for the leading edge, to the controller unit 400 via a controller interface control communication line 356.

Then, the marking unit 503 transfers image data transmitted via a controller interface image communication line 357 onto a recording sheet and fixes the transferred image data to the recording sheet.

Figure 4:
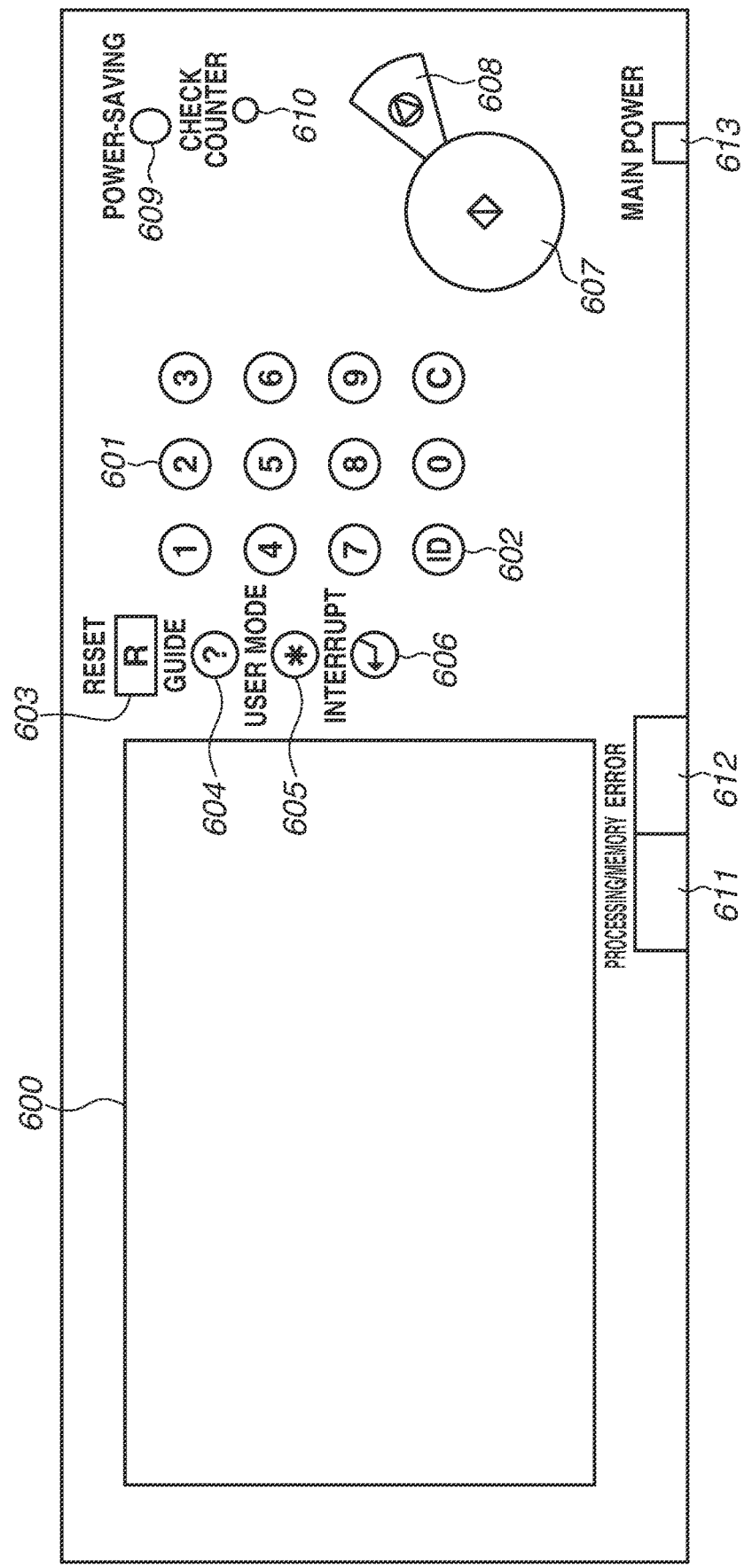
FIG. 4 illustrates an operation unit.

The operation unit 405 illustrated in FIG. 3 will be described below with reference to FIG. 4. A liquid crystal display (LCD) touch panel 600 is used for major mode settings and status displays. Numeric keys 601 receive input of a numerical value of 0 to 9. An identification (ID) key 602 is used to input a department number under which the apparatus is managed and a passcode.

A reset key 603 is a key for resetting a set mode. A guide key 604 is a key for displaying a mode description screen. An interruption key 606 is a key for executing interruption copy.

A start key 607 is a key that receives an instruction to execute copying or scanning A stop key 608 is a key for stopping a job (copy job, scan job) that is being executed.

A user mode key 605 is a key for changing to a user mode screen. The image forming apparatus 1000 receives various settings about the apparatus via the user mode screen.

A power-saving key 609 is a key for changing the state of the image forming apparatus 1000 to a power-saving state. When the image forming apparatus 1000 is in the power-saving state, re-pressing of the power-saving key 609 allows the image forming apparatus 1000 to recover from the power-saving state.

A counter check key 610 is a key for causing a LCD to display a count screen that displays the total number of copied sheets.

A light-emitting diode (LED) 611 indicates that images are accumulated in the image memory unit 404 during job execution. An error LED 612 indicates that the apparatus is in an error state, e.g., a jam has occurred or a door is opened. A power LED 613 indicates that a main switch of the apparatus is turned on.

Figure 5A:
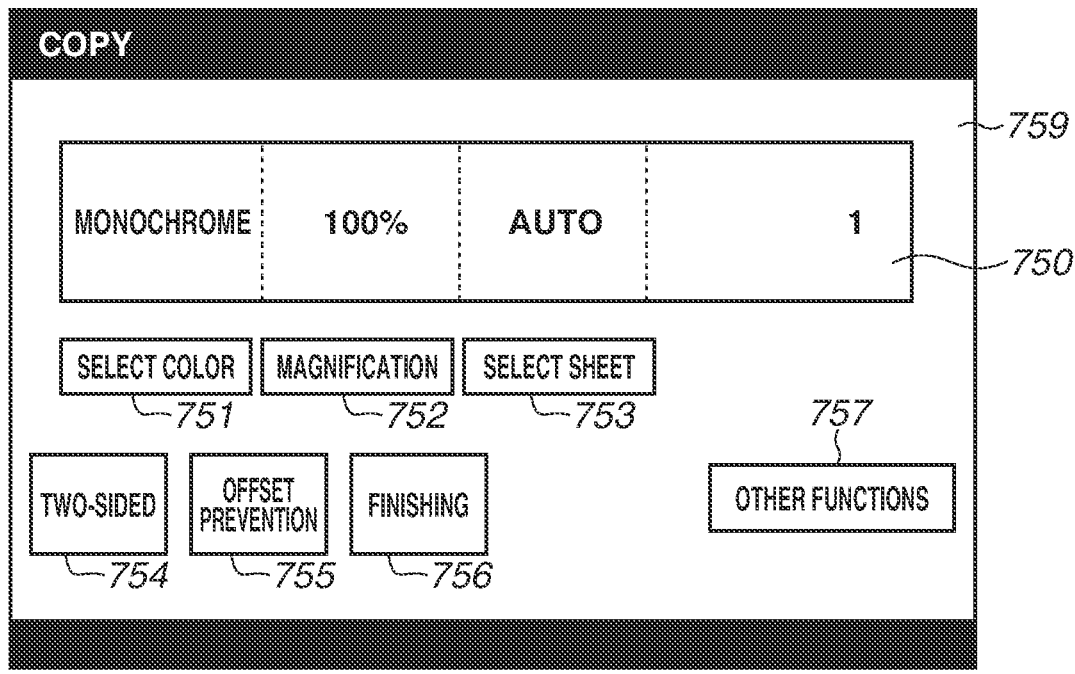
FIGS. 5A, 5B, 5C, and 5D each illustrate an example of a screen that is displayed on a liquid crystal display (LCD) touch panel.

A copy screen 759 in FIG. 5A is a screen that is displayed on the LCD touch panel 600. Buttons for making basic settings, such as a color selection button 751, a magnification button 752, and a sheet selection button 753 are provided on the copy screen 759 as illustrated in FIG. 5A, and the current settings are displayed in a section 750. Settings other than the basic settings are selectable by pressing an other-functions button 757. FIG. 5C illustrates an other-functions setting screen 760. Settings of functions other than the functions that can be set using the color selection button 751, the magnification button 752, and the sheet selection button 753 are settable on the other-functions setting screen 760. A shortcut button for a function that is frequently used by the user among the above-described functions can be generated on the copy screen 759. In the present exemplary embodiment, a two-sided button 754 for setting two-sided printing and an offset prevention button 755 for setting a document offset prevention function are provided as shortcut buttons on the copy screen 759. A finishing button 756 for setting an output mode in printing and post-processing is also provided as a shortcut button on the copy screen 759.

Figure 5B:
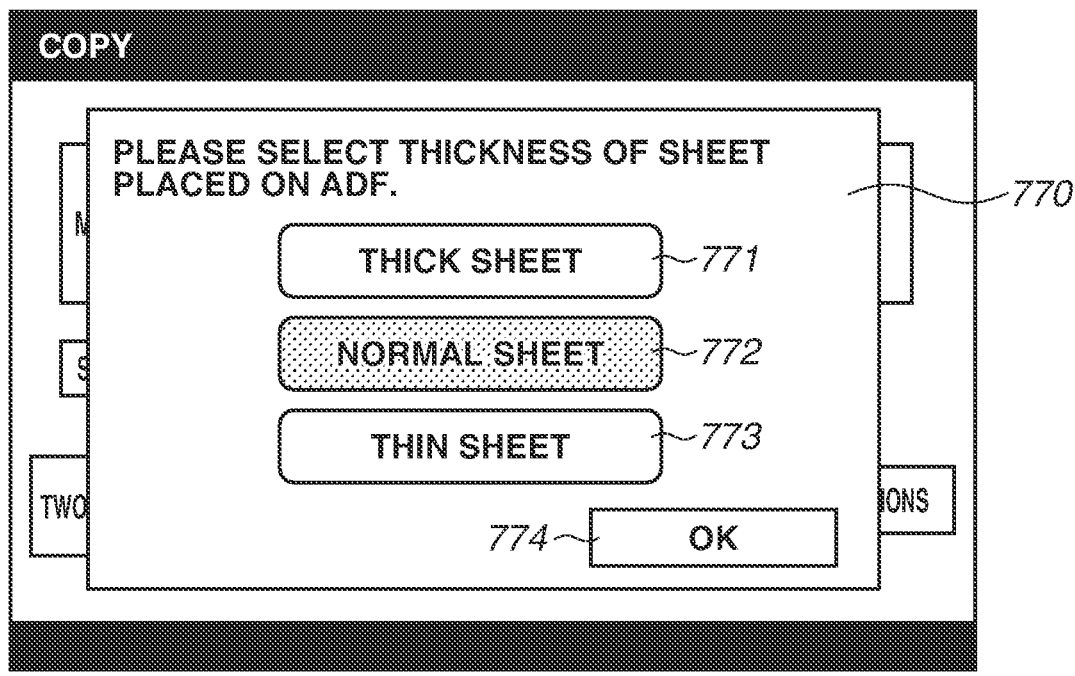
Figure 5C:
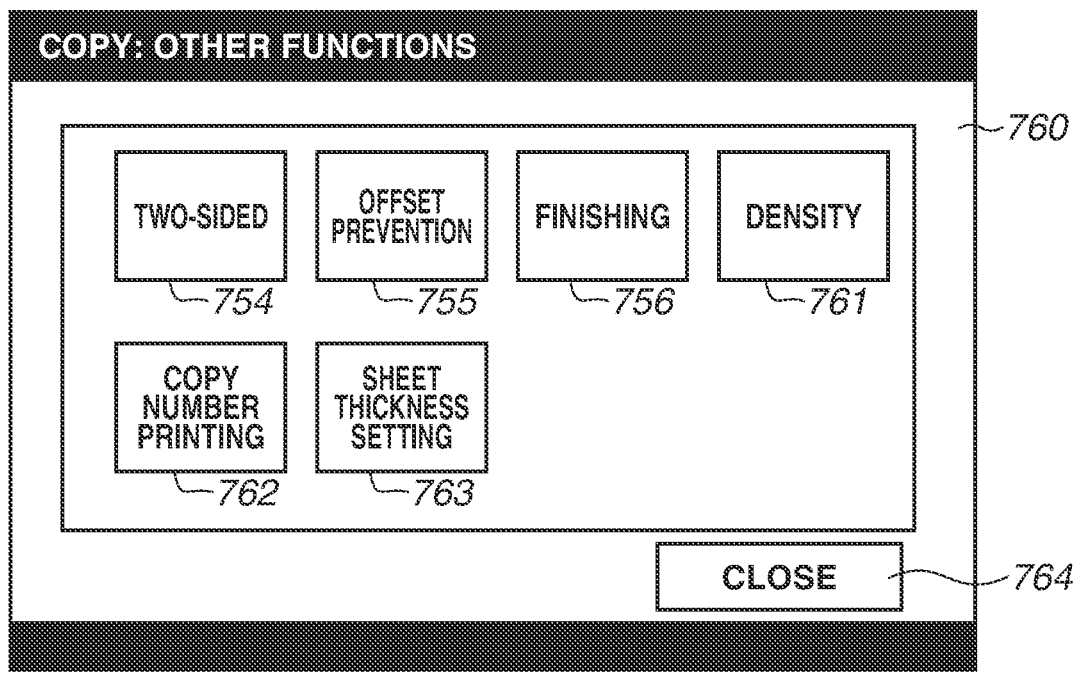

A sheet thickness setting screen 770 in FIG. 5B is an example of a screen for setting the thickness of a document (sheet thickness). For example, the sheet thickness setting screen 770 in FIG. 5B is displayed in a pop-up form when the document detection sensor 23 detects a document. Further, the sheet thickness setting screen 770 can be displayed manually by selecting a sheet thickness setting button to be displayed by selecting the other-functions button 757. On the sheet thickness setting screen 770, a thick sheet 771, a normal sheet 772, and a thin sheet 773 are selectable. While the example in which the thick sheet 771, the normal sheet 772, and the thin sheet 773 are displayed as buttons is described in the present exemplary embodiment, each button can be set as a single record and a list of the records can be displayed. The buttons and records are examples of an object. The user can set a sheet thickness by selecting the sheet thickness from among the thick sheet 771, the normal sheet 772, and the thin sheet 773 and then pressing an OK key 774. The set sheet thickness is stored in the RAM 406.

The other-functions setting screen 760 in FIG. 5C is a screen for setting an application function of the copy function. The other-functions setting screen 760 is displayed when the other-functions button 757 on the copy screen 759 is selected. The other-functions setting screen 760 includes a density button 761 for setting a print density in addition to the two-sided button 754, the offset prevention button 755, and the finishing button 756. Further, the other-functions setting screen 760 includes a copy number printing button 762 for setting a designation of printing a copy number on a print document and the sheet thickness setting function 763 for setting a document thickness setting.

Figure 5D:
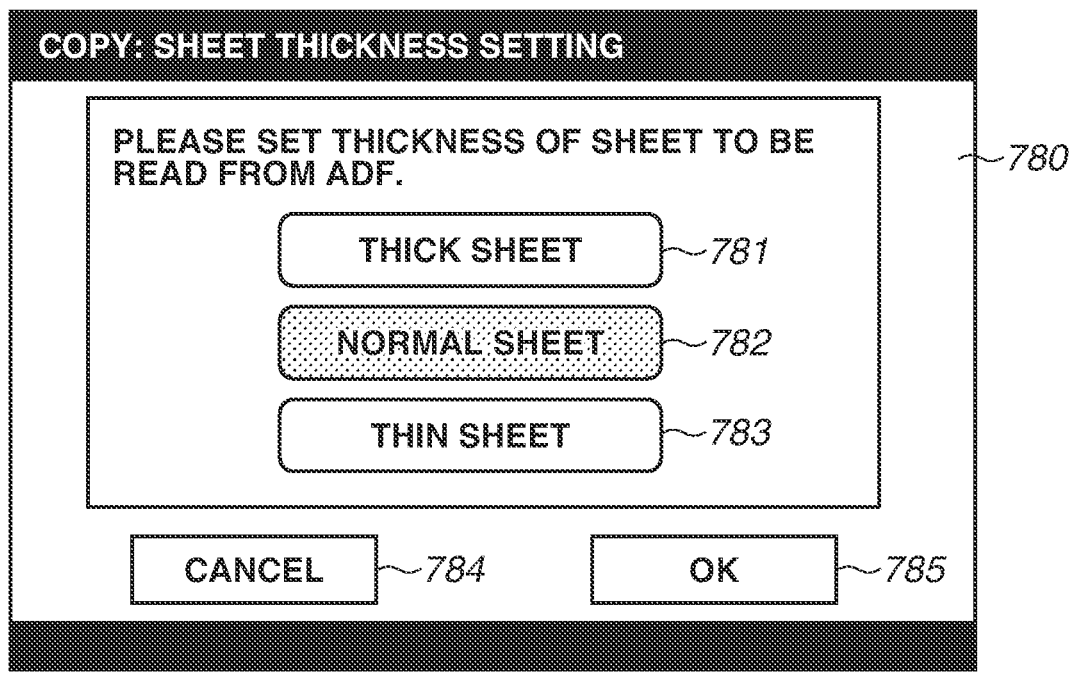

FIG. 5D illustrates an example of a sheet thickness setting screen on an application sheet thickness setting screen 780. The application sheet thickness setting screen 780 is displayed when the sheet thickness setting function 763 on the other-functions functions setting screen 760 is pressed. On the application sheet thickness setting screen 780, a thick sheet 781, a normal sheet 782, and a thin sheet 783 are selectable. A sheet thickness is set by selecting the sheet thickness and then pressing an OK key 785. The sheet thickness setting can be cancelled by selecting a cancel key 784. While the example in which the thick sheet 781, the normal sheet 782, and the thin sheet 783 are displayed as buttons is described in the present exemplary embodiment, each button can be set as a single record and a list of the records can be displayed. The buttons and records are examples of an object. The user sets a sheet thickness by selecting the sheet thickness from among the thick sheet 781, the normal sheet 782, and the thin sheet 783 and then pressing the OK key 785. The set sheet thickness is stored in the RAM 406.

Figure 6A:
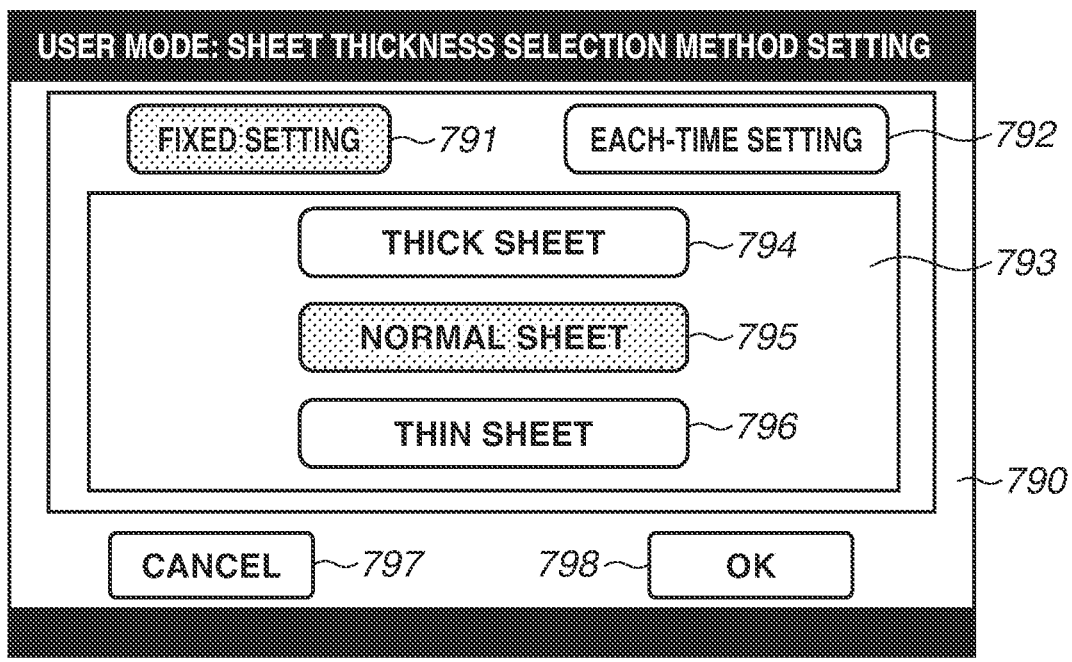
FIGS. 6A, 6B, and 6C each illustrate an example of a sheet thickness selection method setting screen that is displayed on the LCD touch panel.

FIG. 6A illustrates an example of a sheet thickness selection method setting screen. The sheet thickness selection method setting screen is displayed by operating the user mode screen. Specifically, the user mode screen is displayed when the user mode key 605 of the operation unit 405 is pressed. While not illustrated, the user mode screen also provides other functions for setting various settings in the image forming apparatus 1000 besides those described above.

A sheet thickness selection method setting screen 790 includes a fixed setting 791 and an each-time setting 792, which are buttons for setting a sheet thickness selection method. The each-time setting 792 is a button for enabling a function of automatically displaying the sheet thickness setting screen 770 when a document placed on the document tray 30 is detected. The fixed setting 791 is a button for disabling the function of automatically displaying the sheet thickness setting screen 770 when a document placed on the document tray 30 is detected. The user selects one of the fixed setting 791 and the each-time setting 792 to set the selected sheet thickness selection method. In a case where the fixed setting 791 is selected, a thick sheet 794, a normal sheet 795, and a thin sheet 796 for which a sheet thickness is to be set are displayed in a sheet thickness fixing setting region 793. The thick sheet 794, the normal sheet 795, and the thin sheet 796 are each selectable. If an OK key 798 is selected in a state where one of the thick sheet 794, the normal sheet 795, and the thin sheet 796 is selected, the fixed setting as the sheet thickness selection method and the selected sheet thickness are set and stored in the RAM 406.

Figure 6B:
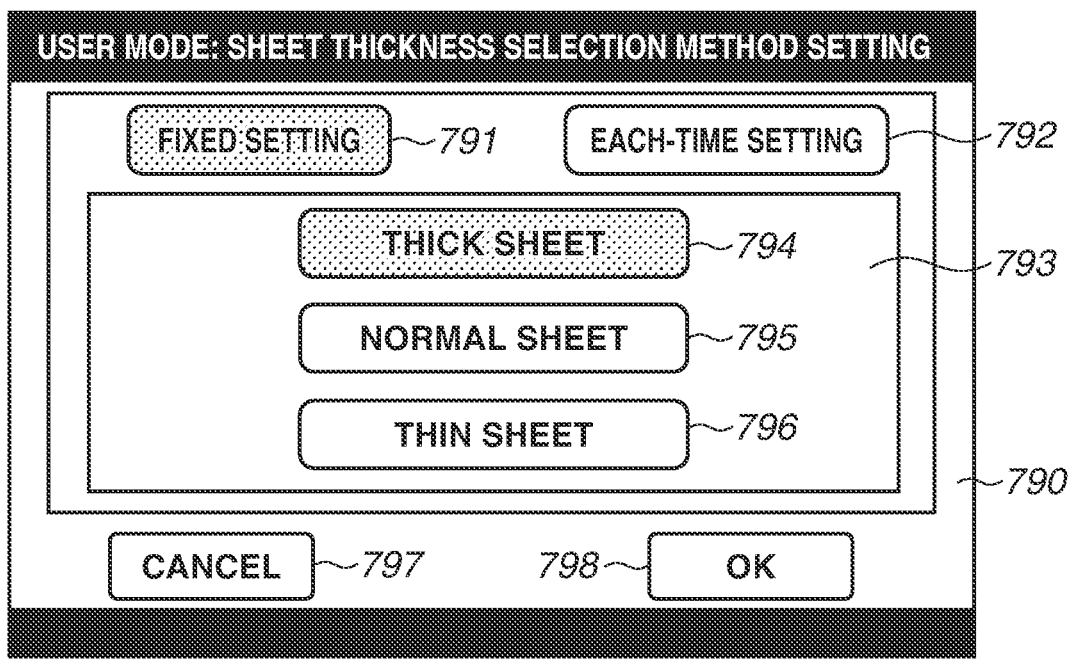

A specific example will be described below with reference to FIG. 6B. FIG. 6B illustrates an example of a screen in a case where the fixed setting is selected as the sheet thickness selection method setting and the thick sheet is selected as a sheet thickness fixing setting. FIG. 6B illustrates a state where the fixed setting 791 is selected as the sheet thickness setting and the thick sheet 794 is selected. In this state, if the OK key 798 is pressed, the fixed setting is set as a sheet thickness selection method 701 in FIG. 7 and the thick sheet is set as a sheet thickness fixed setting 702 in FIG. 7 described below.

If a cancel key 797 is selected, the sheet thickness selection method setting and the sheet thickness setting are canceled.

Figure 6C:
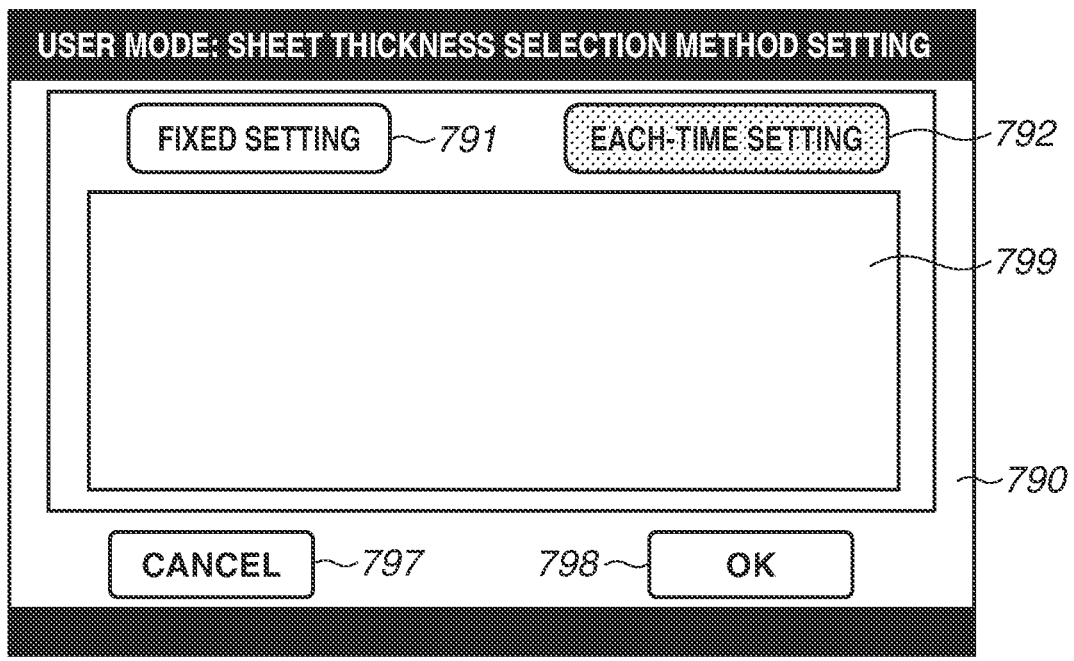

FIG. 6C illustrates an example of a screen in a case where the each-time setting 792 is set as the sheet thickness selection method setting. In a case where the each-time setting 792 is selected as the sheet thickness setting, no setting button is displayed in a sheet thickness fixing setting region 799. In this state, if the OK key 798 is pressed, the each-time setting is set as the sheet thickness selection method 701 in FIG. 7.

FIG. 7 illustrates an example of setting values stored in the RAM 406. An apparatus setting is an area where the setting values for common use by the entire apparatus are stored, and the sheet thickness selection method setting 701, the sheet thickness fixed setting 702, and a sheet thickness designation setting 703 are included in the apparatus setting area. There can be other apparatus settings. A copy setting 710 is an area where the setting values that are for use in the copy function are stored. Examples include a sheet thickness setting 711, page number printing 712, N-in-one printing 713, binding 714, and number of copies 715. The above-described setting items are mere examples, and other copy settings can be stored. Further, there can be an area for storing the setting values for other functions other than the copy function, such as a data transmission function.

The image forming apparatus 1000 according to the present exemplary embodiment controls execution of a copy job based on the above-described settings.

(Flowchart of Setting Sheet Thickness Selection Method Setting on User Mode Screen)

Figure 8:
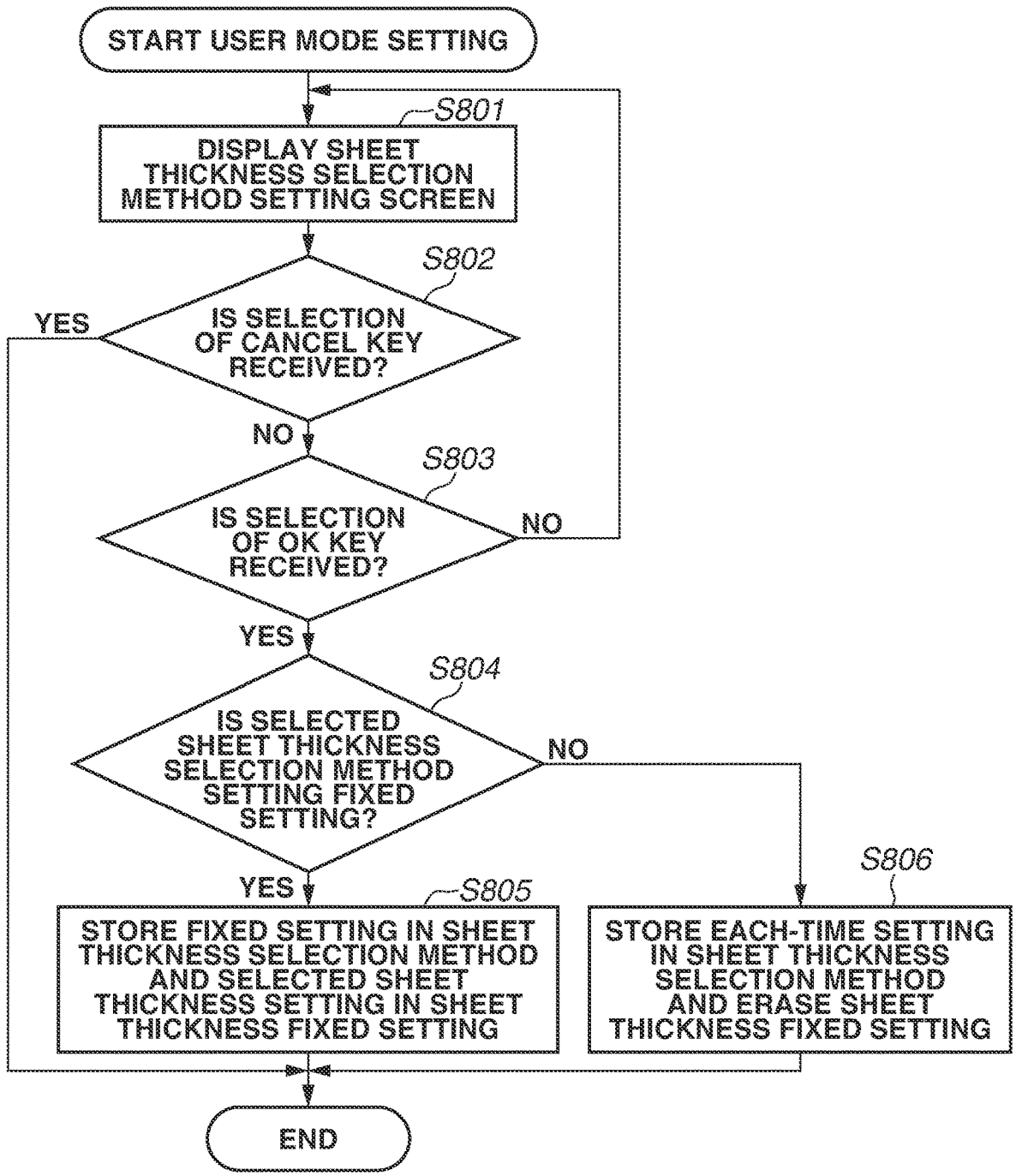
FIG. 8 is a flowchart illustrating a process of setting a sheet thickness selection method according to a first exemplary embodiment.

First, a flowchart of setting the sheet thickness selection method on the user mode screen will be described below with reference to FIG. 8.

When the user mode key 605 of the operation unit 405 is selected, the user mode screen is displayed. The flowchart in FIG. 8 is started when the sheet thickness selection method setting is selected on the user mode screen. The CPU 401 of the controller unit 400 executes a control program read from the ROM 407 and developed onto the RAM 406 to execute the flowchart.

In step S801, the CPU 401 displays the sheet thickness selection method setting screen 790 illustrated in FIG. 6A on the LCD touch panel 600. Then, the LCD touch panel 600 receives selection of the fixed setting 791 or the each-time setting 792 and selection of the thick sheet 794, the normal sheet 795, or the thin sheet 796 displayed in the fixed sheet thickness setting region 793 on the sheet thickness selection method setting screen 790. The CPU 401 stores the received settings in the RAM 406.

Next, in step S802, the CPU 401 determines whether selection of the cancel key 797 is received. In a case where selection of the cancel key 797 is received (YES in step S802), the flowchart is ended without reflecting the selection state of the sheet thickness selection method setting 790 to the apparatus setting. On the other hand, in a case where selection of the cancel key 797 is not received (NO in step S802), the processing proceeds to step S803.

In step S803, the CPU 401 determines whether selection of the OK key 798 is received. In a case where selection of the OK key 798 is received (YES in step S803), the processing proceeds to step S804. On the other hand, in a case where selection of the OK key 798 is not received (NO in step S803), the processing returns to step S801.

In step S804, the CPU 401 determines whether the setting selected as the sheet thickness selection method is the fixed setting 791. In a case where the fixed setting 791 is selected (YES in step S804), the processing proceeds to step S805. On the other hand, in a case where the each-time setting 792 is selected (NO in step S804), the processing proceeds to step S806.

In step S805, the CPU 401 stores the fixed setting as the sheet thickness selection method 701 of an apparatus setting 700. Then, the CPU 401 stores the selected sheet thickness, among the thick sheet 794, the normal sheet 795, and the thin sheet 796 displayed in the fixed sheet thickness setting region 793, as the sheet thickness fixed setting 702, and the flowchart is ended.

In step S806, the CPU 401 stores the each-time setting as the sheet thickness selection method 701 of the apparatus setting 700, and the flowchart is ended.

Next, details of the processing by the sheet thickness selection method of the apparatus setting 700 in executing a scan on a document placed on the ADF 100 according to the present exemplary embodiment will be described below with reference to a flowchart in FIG. 9.

The flowchart is started in a state where the LCD touch panel 600 displays the copy screen 759. The CPU 401 of the controller unit 400 executes a control program that is read from the ROM 407 and developed onto the RAM 406 to perform the series of processing.

In step S901, the CPU 401 determines whether a detection state of the document detection sensor 23 of the ADF 100 is changed. In a case where the CPU 401 detects a change in the document detection state from "not detected" to "detected" (YES in step S901), the processing proceeds to step S902. On the other hand, in a case where the CPU 401 does not detect a change in the document detection state (NO in step S901), the processing proceeds to step S906.

In step S902, the CPU 401 determines whether the each-time setting is stored as the sheet thickness selection method 701 stored in the RAM 406. In a case where the each-time setting is stored (YES in step S902), the processing proceeds to step S903. On the other hand, in a case where the each-time setting is not stored (NO in step S902), the processing proceeds to step S906.

In step S903, the CPU 401 displays the sheet thickness setting screen 770 illustrated in FIG. 5B on the current screen on the LCD touch panel 600 in a superimposed manner and receives selection of the sheet thickness setting via the sheet thickness setting screen 770.

In step S904, the CPU 401 determines whether selection of the OK key 774 is received. In a case where selection of the OK key 774 is received (YES in step S904), the processing proceeds to step S905. On the other hand, in a case where selection of the OK key 774 is not received (NO in step S904), the processing returns to step S903, and the CPU 401 displays the sheet thickness setting screen 770 on the LCD touch panel 600.

In step S905, the CPU 401 stores information (thick sheet/normal/thin sheet) about the sheet thickness that is selected at the time point as the sheet thickness designation setting 703 of the apparatus setting 700 stored in the RAM 406, and the processing proceeds to step S906.

In step 5906, the CPU 401 displays the copy screen 759 illustrated in FIG. 5 on the LCD touch panel 600 and receives a copy setting from the user. In a case where a copy setting is changed on the copy screen 759 or the other-functions setting screen 760, the changed copy setting is stored in the corresponding setting item of the copy setting 710 in the RAM 406. In a case where the other-functions setting screen 760 is to be displayed, a process of changing a function to be displayed is performed by setting the sheet thickness selection method setting 701 of the apparatus setting 700. Details of the process will be described below with reference to FIG. 10.

Next, in step S907, the CPU 401 determines whether selection of the start key 607 of the operation unit 405 is received. In a case where selection of the start key 607 is received (YES in step S907), the processing proceeds to step S908. On the other hand, in a case where selection of the start key 607 is not received (NO in step S907), the processing returns to step S901.

In step S908, the CPU 401 determines whether a document is placed on the document tray 30 of the ADF 100 based on a signal from the document detection sensor 23. In a case where the CPU 401 determines that a document is placed on the document tray 30 (YES in step S908), the processing proceeds to step S910. On the other hand, in a case where the CPU 401 determines that no document is placed on the document tray 30 (NO in step S908), the processing proceeds to step S909.

In step S909, the CPU 401 instructs the image reading unit 200 to scan the document placed on the platen glass 202. The image reading unit 200 having received the instruction scans the document placed on the platen glass 202. In this scan, the document is not conveyed and, thus, the scan is not affected by the conveyance speed, so that the sheet thickness setting 711 stored in the RAM 406 is not used.

In step S910, the CPU 401 controls the ADF 100 based on the sheet thickness setting 711 of the copy setting 710 stored in the RAM 406 to execute a scan. Details of the processing in step S910 will be described below with reference to FIG. 12.

When the scan is finished, image data generated based on the document image scan is transmitted to the image forming unit 500 via the printer IF 408, and printing is executed. When the printing is finished, the CPU 401 initializes the copy setting 710 including the sheet thickness setting 711 stored in the RAM 406, and the processing is ended. While the copy function is described as an example of a function of executing a scan in the present exemplary embodiment, applications to other functions, such as mail transmission and third generation (G3) facsimile transmission, are also possible. In a case of mail transmission, image data generated based on the scanned document image is transmitted to a designated destination via a network IF (not illustrated) when a scan is finished.

Details of a process of enabling/disabling the sheet thickness setting in the case where the other-functions setting screen 760 is selected in step S906 in the first exemplary embodiment will be described below with reference to a flowchart in FIG. 10. The flowchart is started when an instruction to display the other-functions setting screen 760 is provided. The CPU 401 of the controller unit 400 executes a control program that is read from the ROM 407 and developed onto the RAM 406 to perform the series of processing.

In step S1001, the CPU 401 reads the setting value that is stored in the sheet thickness selection method 701 of the apparatus setting 700. In a case where the stored setting is the fixed setting (YES in step S1001), the processing proceeds to step S1002. On the other hand, in a case where the stored setting is the each-time setting (NO in step S1001), the processing proceeds to step S1004.

In step S1002, the CPU 401 determines that the sheet thickness setting 711 of the copy setting 710 is enabled, and displays on the LCD touch panel 600 the other-functions setting screen 760 on which the sheet thickness setting button 763 is arranged as illustrated in FIG. 5C.

In step S1003, the CPU 401 reads the setting value that is stored in the sheet thickness fixed setting 702 of the apparatus setting 700 and stores the read setting value in the sheet thickness setting 711 of the copy setting 710. Then, the flowchart is ended.

In step S1004, the CPU 401 determines that the sheet thickness setting 711 of the copy setting 710 is disabled, and the LCD touch panel 600 displays an other-functions setting screen 765 on which no sheet thickness setting button 763 is arranged, which will be described below with reference to FIG. 11, and the flowchart is ended.

Figure 11:
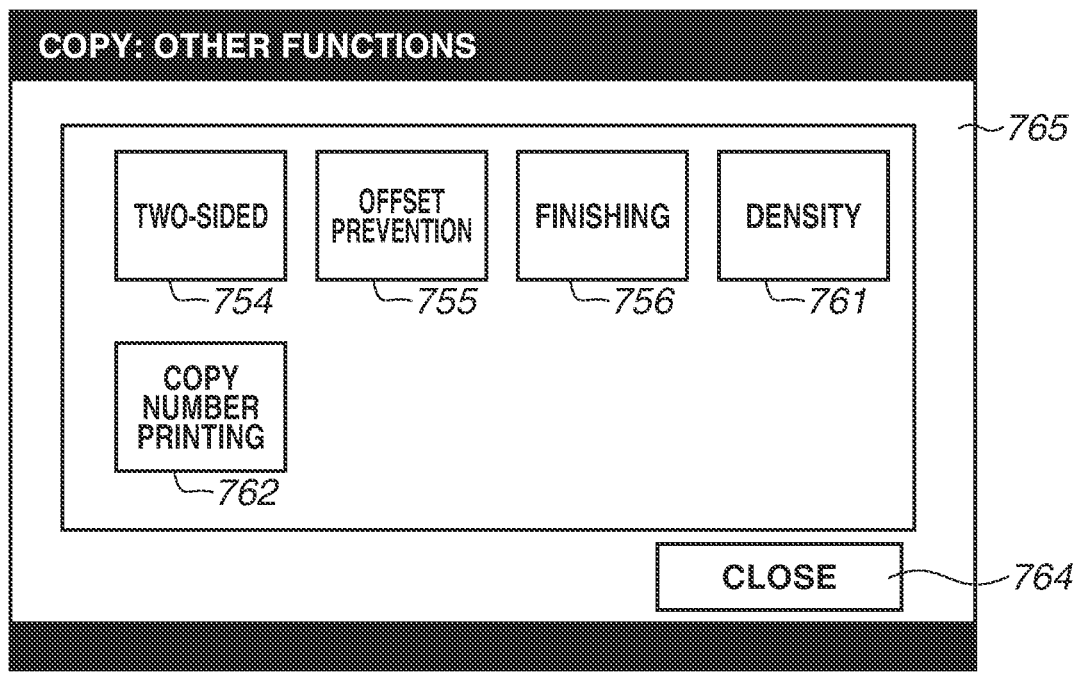
FIG. 11 illustrates an example of a screen in a case where the sheet thickness setting is disabled in the first exemplary embodiment.

FIG. 11 illustrates an example of the other-functions setting screen 765 displayed in the case where the each-time setting is stored as the sheet thickness selection method 701. The other-functions setting screen 765 is a screen that is displayed at the press of the other-functions button 757 on the copy screen 759 as with the other-functions setting screen 760 in FIG. 5C. In a case where the each-time setting is stored as the sheet thickness selection method 701, the sheet thickness setting is not set as a setting for each copy job, so that the sheet thickness setting button 763 for setting the document thickness setting is not arranged on the screen. Meanwhile, there is a possibility that the other functions are used, so that the other function buttons are provided on the screen.

Figure 12:
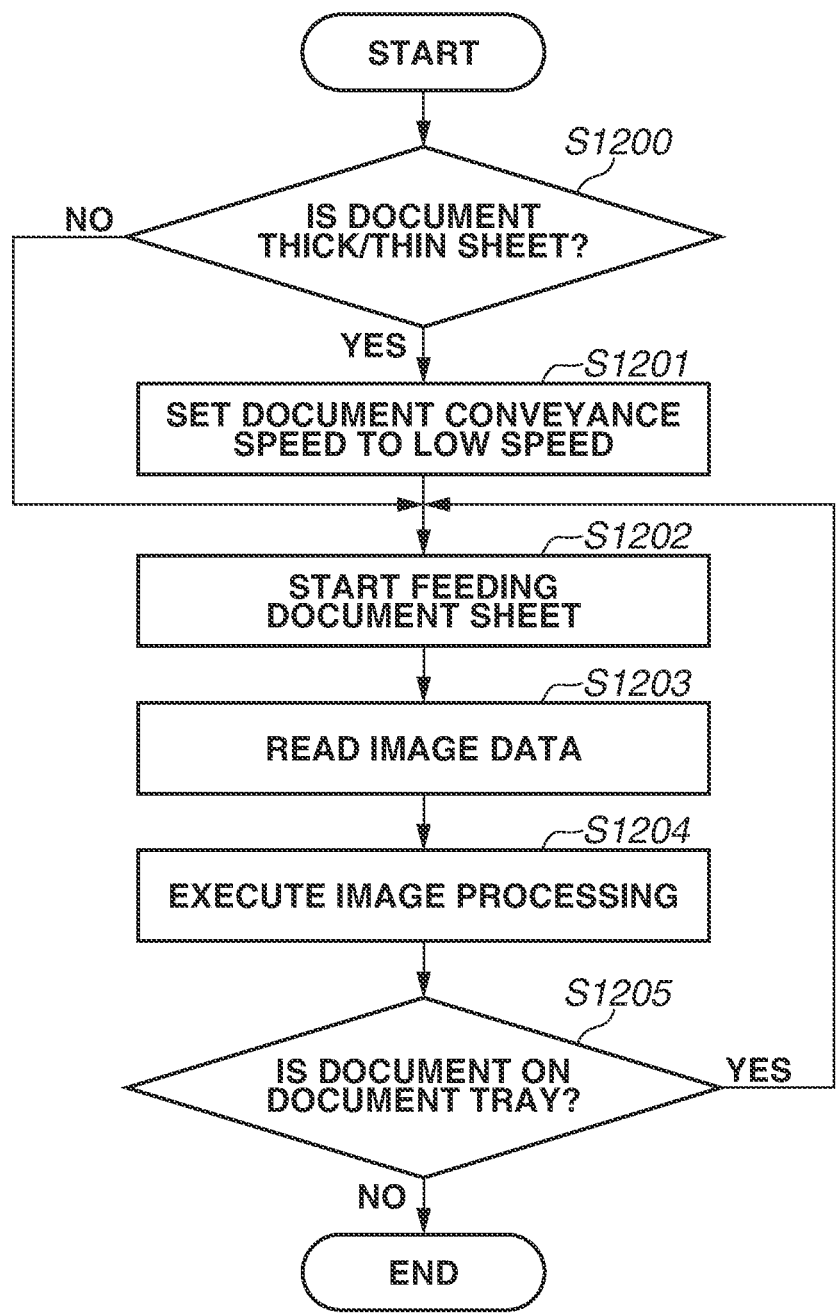
FIG. 12 is a flowchart illustrating a process of executing a scan according to the first exemplary embodiment.

Next, details of the ADF scan processing in step S910 in the present exemplary embodiment will be described below with reference to a flowchart in FIG. 12. The CPU 321 of the image reading unit 200 executes a control program that is read from the ROM 322 and developed onto the RAM 323 in response to a scan execution instruction from the CPU 401 to perform the processing illustrated in FIG. 12.

In step S1200, the CPU 321 having received an instruction to start document reading from the CPU 401 of the controller unit 400 determines the value of the sheet thickness setting 711 of the copy setting 710. In a case where the sheet thickness determined in step S1200 is a normal sheet (predetermined thickness), the processing proceeds to step S1202. In step S1202, the CPU 321 performs control so that document feeding is started. In a case where the sheet thickness determined in step S1200 is a thick sheet (thickness thicker than a predetermined thickness) or a thin sheet (thickness thinner than the predetermined thickness), the processing proceeds to step S1201. In step S1201, the CPU 321 notifies the CPU 300 of the ADF 100 that the document conveyance speed is to be set to a low speed.

Upon receipt of the notification that the document conveyance speed is to be set to a low speed, the CPU 300 reduces the number of rotations of respective motors that drive the conveyance roller 3, the registration roller 4, the conveyance roller 5, the conveyance roller 6, the large roller 7, and the sheet discharge roller 8 to control the conveyance speed to be lower than a normal conveyance speed. For example, the CPU 300 controls the conveyance speed so that the conveyance speed is set to half of the normal conveyance speed. In this way, in the case where the document is a thick sheet, torque deficiencies at a curved portion of the conveyance path are solved to prevent the thick-sheet document from causing a jam at the curved portion of the conveyance path. Further, in the case where the document is a thin sheet, a document is discharged after the previously discharged thin-sheet document is completely dropped onto a sheet discharge portion. This improves stacking performance of the sheet discharge portion, and the thin-sheet document is prevented from causing a jam in the vicinity of the sheet discharge portion.

After the process of step S1201, the processing proceeds to step S1202. In step S1202, and the CPU 321 starts feeding a document sheet. Then, the processing proceeds to step S1203. In step S1203, the CPU 321 causes the image reading unit 200 to read image data, and the processing proceeds to step S1204. The read image data is transmitted to the controller unit 400 via the image data information communication line 353 and stored in the image memory unit 404 via the scanner IF 403.

In step S1204, the CPU 401 executes image processing on the image data stored in the image memory unit 404. In step S1205, the CPU 321 determines whether any document is present on the document tray 30. In a case where a document is present on the document tray 30 (YES in step S1204), the processing returns to step S1202. On the other hand, in a case where no document is on the document tray 30 (NO in step S1204), the processing illustrated in the flowchart is ended.

According to the first exemplary embodiment, a setting as to whether a document thickness is to be set each time a document is placed on the document tray 30 of the ADF 100 can be made in advance. Then, the setting as to whether a sheet thickness is to be set each time a document is placed on the document tray 30 of the ADF 100 can be stored as an apparatus setting. This makes it possible to set the sheet thickness setting by fewer operations based on the thickness of sheets to be used by the user while preventing any setting from being unset. For example, in a case where documents of various thicknesses are likely to be read in the environment where the image forming apparatus 1000 is installed, the each-time setting is stored to prevent the document thickness setting from being unset, preventing a sheet jam due to erroneous document conveyance from occurring and image data from being incorrectly read from the document.

In a case where only documents of the same thickness are to be scanned or scans of documents of different thicknesses are not frequently performed in the environment where the image forming apparatus 1000 is installed, the fixed setting is stored to reduce the necessity of setting the document thickness setting each time.

While the process of setting a setting for a new copy job to be executed via the copy screen 759 or the other-functions setting screen 760 is described in the first exemplary embodiment, there is a case where the copy function setting is set by reading a previously-stored setting. For example, there is a case where a copy setting in the previous execution of the copy function is stored as a history and the history of the copy setting is read, and there is also a case where combinations of frequently-used settings are stored as favorite settings and the stored favorite settings are collectively read afterward. There is another case where the values set as default settings are displayed when the copy screen 759 is displayed. In a case where such setting reading processing is performed and the read setting contains the sheet thickness setting 711, it is determined whether the sheet thickness setting 711 is enabled based on the value stored in the sheet thickness selection method 701 of the apparatus setting 700 as in the flowchart in FIG. 10. In the case where the sheet thickness selection method 701 is set to the each-time setting, it is determined that the sheet thickness setting 711 is disabled. The sheet thickness setting 711 contained in the read setting is ignored, and only the other settings are reflected. Then, when a document is detected on the ADF 100, the sheet thickness setting screen 770 is displayed to prompt the user to set the thickness of the document when the document is placed. As described above, the setting as to whether the sheet thickness setting screen 770 is to be displayed as a document is placed can be made in the case where the copy setting is read from the history and in the case where the combinations of frequently-used settings are read.

Information about the document thickness set by the user via the screen illustrated in FIG. 5B or 5D in the present exemplary embodiment is erased at the press of the reset key 603. Further, the information is erased after printing or transmission of the scanned image is finished, so that the information cannot be used in a next job. In other words, the information is erased when the job is completed. This prevents the document thickness set by the user via the screen illustrated in FIG. 5B or 5D from being unintentionally used for another document in a next job. On the contrary, information about the document thickness set via the screen illustrated in FIG. 6A is not erased even after printing or transmission of a scanned image is finished.

Further, the example in which the user is to select a thickness from the thick sheet 794, the normal sheet 795, and the thin sheet 796 when the fixed setting 791 is selected is described in the first exemplary embodiment. Alternatively, in a case where the fixed setting 791 is selected, a default value at the time of factory shipment can be stored as the sheet thickness fixed setting 702 and used. For example, the normal sheet 795, which is likely to be used frequently, can be stored as the default value.

A second exemplary embodiment will be described below. The first exemplary embodiment has been described using the example in which setting of the document thickness setting via the other functions setting screen is disabled in the case where sheet thickness selection method is the each-time setting. In the second exemplary embodiment, an example in which the sheet thickness setting is changeable via the copy function even in the case where the sheet thickness selection method is the each-time setting will be described.

Figure 13:
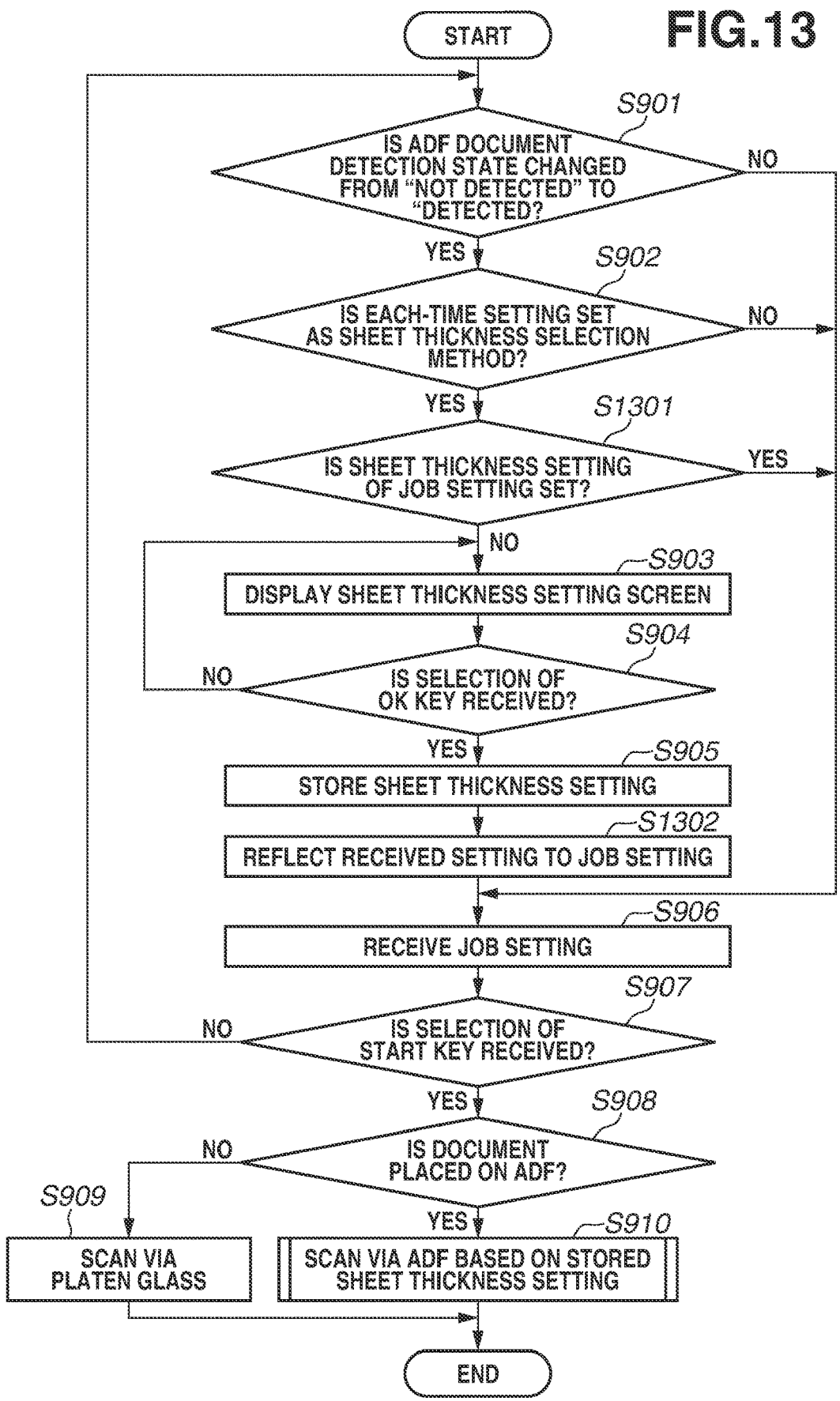
FIG. 13 is a flowchart illustrating a process of setting a sheet thickness according to a second exemplary embodiment.

Control in the case where the document thickness setting in FIG. 5D is settable even when the each-time setting is set as the sheet thickness selection method 701 will be described below with reference to a flowchart in FIG. 13.

While copying is described as an example, applications to mail transmission, in which an image is scanned and mailed, and G3 facsimile transmission, in which an image is scanned and faxed, are also possible. In the description of the flowchart, each step similar to that in the first exemplary embodiment is given the same step number, and description thereof is omitted. The CPU 401 of the controller unit 400 executes a control program that is read from the ROM 407 and developed onto the RAM 406 to perform the series of processing.

Figure 9:
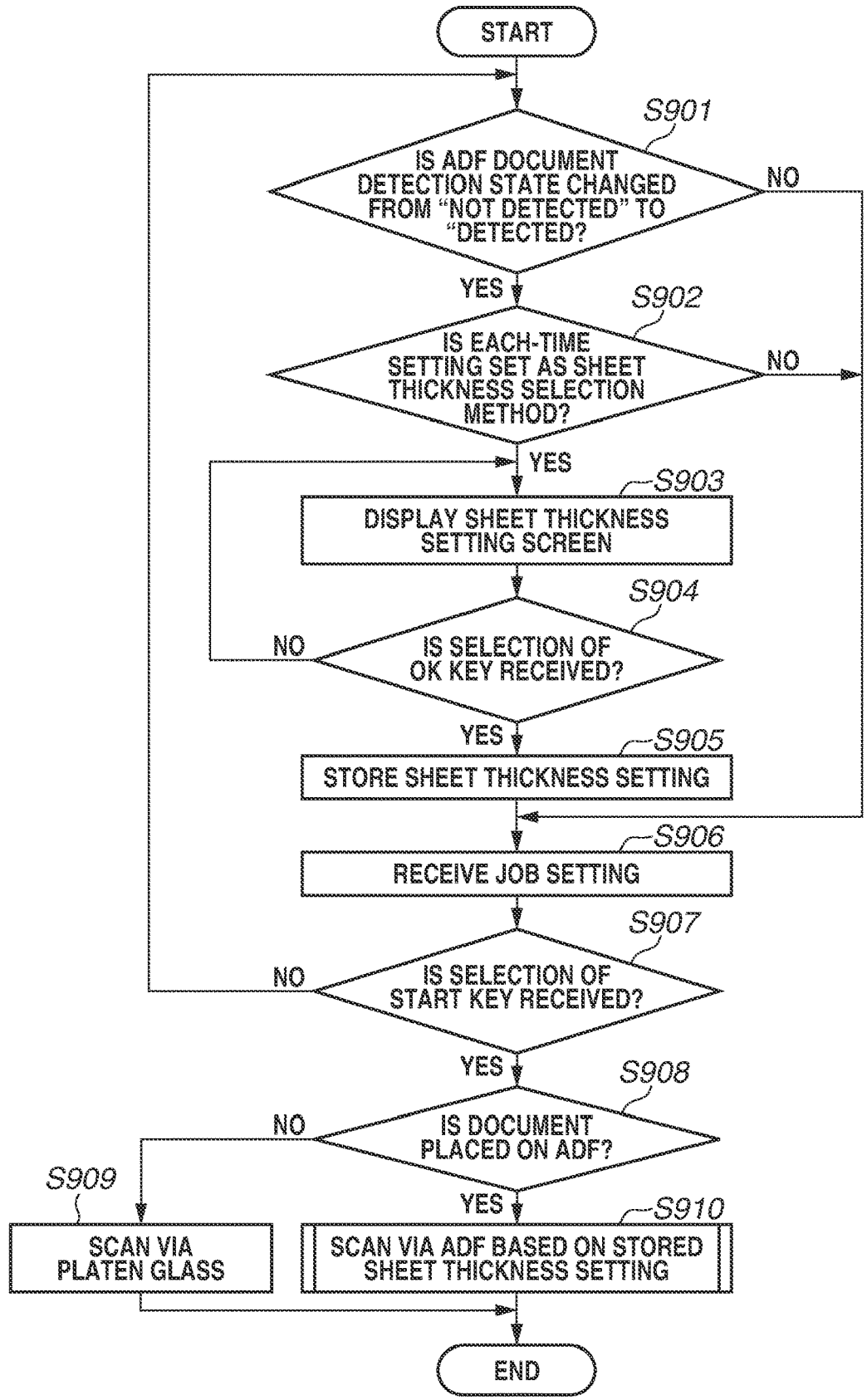
FIG. 9 is a flowchart illustrating a process of setting a sheet thickness according to the first exemplary embodiment.

In steps S901 and S902, operations similar to those in steps S901 and S902 in FIG. 9 in the first exemplary embodiment are performed. In the present exemplary embodiment, in step S902, if the CPU 401 determines that the sheet thickness selection method 701 is set to the each-time setting (YES in step S902), the processing proceeds to step S1301.

In step S1301, the CPU 401 determines whether a document thickness setting is stored as the sheet thickness setting 711 of the copy setting 710. In a case where the CPU 401 determines that a document thickness setting is stored (YES in step S1301), the processing proceeds to step S906. On the other hand, in a case where the CPU 401 determines that a document thickness setting is not stored (NO in step S1301), the processing proceeds to step S903. Operations in steps S903, S904, and S905 are similar to those in the first exemplary embodiment. In step S905, the CPU 401 stores the sheet thickness designation setting 703, and then the processing proceeds to step S1302.

In step S1302, the CPU 401 reads the setting stored as the sheet thickness designation setting 703 in step S905 and sets the read setting to the sheet thickness setting 711 of the copy setting 710, and the processing proceeds to step S906. Operations in step S906 and the subsequent steps are similar to those in the first exemplary embodiment, so that description thereof is omitted.

Figure 10:
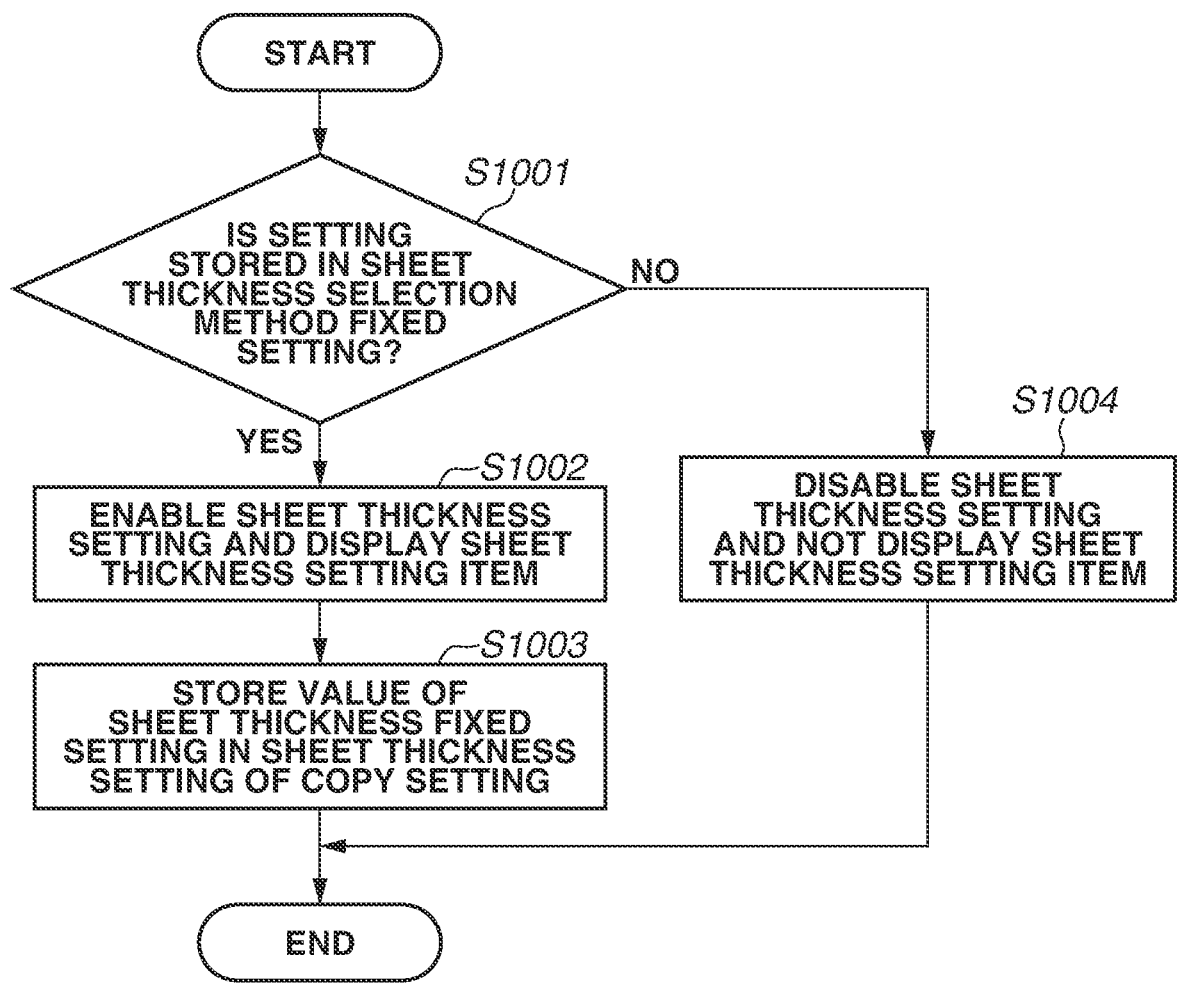
FIG. 10 is a flowchart illustrating a job setting process according to the first exemplary embodiment.

Further, in a case where the other-functions setting screen 760 is selected in step S906 in the second exemplary embodiment, the processing illustrated in FIG. 10 is not executed, and the sheet thickness setting button 763 illustrated in FIG. 5C is displayed on the LCD touch panel 600.

At this time, it is determined that the sheet thickness setting 711 of the copy setting 710 is enabled, and the other-functions setting screen 760 on which the sheet thickness setting button 763 illustrated in FIG. 5C is provided is displayed on the LCD touch panel 600.

According to the second exemplary embodiment, the sheet thickness setting is changeable via the copy function even in the case where the set sheet thickness selection method is the each-time setting. Further, in a case where a user sets the document thickness via the screen in FIG. 5D before a document is placed on the document tray 30, the user does not have to set the document thickness again via the screen in FIG. 5B when the document is placed on the document tray 30, providing a reduction of the user's labor.

The information about the document thickness set by the user via the screen illustrated in FIG. 5B or 5D in the present exemplary embodiment is erased at the press of the reset key 603. Further, the information is erased after printing or transmission of the scanned image is finished, so that the information cannot be used in a next job. In other words, the information is erased when the job is completed. This prevents the document thickness set by the user via the screen illustrated in FIG. 5B or 5D from being unintentionally used for another document in a next job. On the contrary, the information about the document thickness set via the screen illustrated in FIG. 6A is not erased even after printing or transmission of a scanned image is finished.

In the second exemplary embodiment, the sheet thickness setting 711 can be set not only by setting via the screen in FIG. 5D but also by calling a setting history or by calling a frequently-used function. Alternatively, the sheet thickness setting 711 can be set by calling a default setting at the time of activation of the image forming apparatus 1000.

Other Exemplary Embodiments

The above-described exemplary embodiments have been described using the example in which the sheet thickness setting screen 770 is displayed in a popup form when a document is placed. The present disclosure, however, is not limited thereto and, for example, the copy screen 759 can be changed to the sheet thickness setting screen 770 when a document is placed.

Further, in the above-described exemplary embodiments, the example in which the sheet thickness setting screen 770 for setting the document thickness is displayed when a document is placed is described. The present disclosure, however, is not limited thereto and also applicable to an example in which a screen for setting a document size and a setting value of at least one of the items of the other application functions provided on the copy screen 759 is displayed when a document is placed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006204, filed Jan. 17, 2019, which is hereby incorporated by reference herein in its entirety.

What is claimed is:

1. An image processing apparatus configured to convey a document sheet from a document tray based on information about a thickness of the document sheet, the image processing apparatus comprising:
   a detector configured to detect that the document sheet has been placed on the document tray;
   a display device configured to display an object for setting the thickness of the document sheet when the detector detects that the document sheet has been placed on the document tray;
   a sheet conveyance controller configured to cause a conveyor to convey the document sheet based on information about the thickness that is set by the object displayed by the display device; and
   a reader configured to read an image of the document sheet conveyed by the conveyor,
   wherein the image processing apparatus receives a setting as to whether a screen for setting the thickness of the document sheet is to be displayed when the detector detects that the document sheet has been placed.

2. The image processing apparatus according to claim 1, further comprising a storage configured to store information about the thickness of the document sheet separately from the information about the thickness set by the object displayed by the display device,
   wherein, in a case where the screen for setting the thickness of the document sheet is set not to be displayed, the sheet conveyance controller causes the conveyor to convey the document sheet based on the information about the thickness that is stored in the storage.

3. The image processing apparatus according to claim 2, wherein the thickness of the document sheet indicated by the information stored in the storage is preset by the user before the document sheet is placed on the document tray.

4. The image processing apparatus according to claim 2, wherein the thickness of the document sheet indicated by the information stored in the storage is a default value at a time of factory shipment.

5. The image processing apparatus according to claim 1, wherein the sheet conveyance controller causes the conveyor to convey the document sheet at a conveyance speed based on the information about the thickness set by the object displayed by the display device.

6. The image processing apparatus according to claim 5, wherein in a case where the thickness of the document sheet that is set via a screen displayed by the display device is thicker than a predetermined thickness, the sheet conveyance controller sets the conveyance speed of the document sheet to a slower speed than the conveyance speed in a case where the thickness of the document sheet is the predetermined thickness.

7. The image processing apparatus according to claim 5, wherein in a case where the thickness of the document sheet that is set via a screen displayed by the display device is thinner than a predetermined thickness, the sheet conveyance controller sets the conveyance speed of the document sheet to a slower speed than the conveyance speed in a case where the thickness of the document sheet is the predetermined thickness.

8. The image processing apparatus according to claim 1, further comprising a user interface,
   wherein, in a case where the screen for setting the thickness of the document sheet is set to be displayed when the detector detects that the document sheet has been placed, the object for setting the thickness of the document sheet is displayed on a screen that is displayed by user's operation of the user interface, and
   wherein, in a case where the screen for setting the thickness of the document sheet is set not to be displayed when the detector detects that the document sheet has been placed, the object for setting the thickness of the document sheet is not displayed on the screen that is displayed by the user's operation of the user interface.

9. The image processing apparatus according to claim 1, further comprising a printer configured to print the image of the document sheet that is read by the reader.

10. The image processing apparatus according to claim 1, further comprising a transmitter configured to transmit image data generated based on the image of the document sheet that is read by the reader.

11. A method of controlling an image processing apparatus configured to convey a document sheet from a document tray based on information about a thickness of the document sheet, the method comprising:
    displaying an object for setting the thickness of the document sheet when a detector detects that the document sheet has been placed on the document tray;

causing a conveyor to convey the document sheet based on the information about the thickness that is set by the displayed object;

using a reader to read an image of the document sheet conveyed by the conveyor; and receiving a setting as to whether a screen for setting the thickness of the document sheet is to be displayed when the detector detects that the document sheet has been placed.

12. A non-transitory, computer-readable storage medium that stores a program for causing a computer to execute a method of controlling an image processing apparatus configured to convey a document sheet from a document tray based on information about a thickness of the document sheet, the method comprising:

displaying an object for setting the thickness of the document sheet when a detector detects that the document sheet has been placed on the document tray;

causing a conveyor to convey the document sheet based on the information about the thickness that is set by the displayed object;

using a reader to read an image of the document sheet conveyed by the conveyor; and receiving a setting as to whether a screen for setting the thickness of the document sheet is to be displayed when the detector detects that the document sheet has been placed.

13. An image processing apparatus configured to convey a document sheet from a document tray based on information about a thickness of the document sheet, the image processing apparatus comprising:

a detector configured to detect that the document sheet has been placed on the document tray;

a display device configured to display an object for setting the thickness of the document sheet at a predetermined timing on condition that the detector detects that the document sheet has been placed on the document tray;

a sheet conveyance controller configured to cause a conveyor to convey the document sheet based on information about the thickness that is set by the object displayed by the display device; and a reader configured to read an image of the document sheet conveyed by the conveyor, wherein the image processing apparatus receives a setting as to whether a screen for setting the thickness of the document sheet is to be displayed at the predetermined timing on condition that the detector detects that the document sheet has been placed.

14. The image processing apparatus according to claim 13, further comprising a storage configured to store information about the thickness of the document sheet separately from the information about the thickness set by the object displayed by the display device, wherein, in a case where the screen for setting the thickness of the document sheet is set not to be displayed, the sheet conveyance controller causes the conveyor to convey the document sheet based on the information about the thickness that is stored in the storage.

15. The image processing apparatus according to claim 14, wherein the thickness of the document sheet indicated by the information stored in the storage is preset by the user before the document sheet is placed on the document tray.

16. The image processing apparatus according to claim 14, wherein the thickness of the document sheet indicated by the information stored in the storage is a default value at a time of factory shipment.

17. The image processing apparatus according to claim 13, wherein the sheet conveyance controller causes the conveyor to convey the document sheet at a conveyance speed based on the information about the thickness set by the object displayed by the display device.

18. The image processing apparatus according to claim 17, wherein in a case where the thickness of the document sheet that is set via a screen displayed by the display device is thicker than a predetermined thickness, the sheet conveyance controller sets the conveyance speed of the document sheet to a slower speed than the conveyance speed in a case where the thickness of the document sheet is the predetermined thickness.

19. The image processing apparatus according to claim 17, wherein in a case where the thickness of the document sheet that is set via a screen displayed by the display device is thinner than a predetermined thickness, the sheet conveyance controller sets the conveyance speed of the document sheet to a slower speed than the conveyance speed in a case where the thickness of the document sheet is the predetermined thickness.

20. The image processing apparatus according to claim 13, further comprising a user interface, wherein, in a case where the screen for setting the thickness of the document sheet is set to be displayed at the predetermined timing on condition that the detector detects that the document sheet has been placed, the object for setting the thickness of the document sheet is displayed on a screen that is displayed by user's operation of the user interface, and wherein, in a case where the screen for setting the thickness of the document sheet is set not to be displayed at the predetermined timing on condition that the detector detects that the document sheet has been placed, the object for setting the thickness of the document sheet is not displayed on the screen that is displayed by the user's operation of the user interface.

21. The image processing apparatus according to claim 13, further comprising a printer configured to print the image of the document sheet that is read by the reader.

22. The image processing apparatus according to claim 13, further comprising a transmitter configured to transmit image data generated based on the image of the document sheet that is read by the reader.

23. A method of controlling an image processing apparatus configured to convey a document sheet from a document tray based on information about a thickness of the document sheet, the method comprising:

displaying an object for setting the thickness of the document sheet at a predetermined timing on condition that a detector detects that the document sheet has been placed on the document tray;

causing a conveyor to convey the document sheet based on the information about the thickness that is set by the displayed object;

using a reader to read an image of the document sheet conveyed by the conveyor; and receiving a setting as to whether a screen for setting the thickness of the document sheet is to be displayed at the predetermined timing on condition that the detector detects that the document sheet has been placed.

24. A non-transitory, computer-readable storage medium that stores a program for causing a computer to execute a method of controlling an image processing apparatus configured to convey a document sheet from a document tray based on information about a thickness of the document sheet, the method comprising:

displaying an object for setting the thickness of the document sheet at a predetermined timing on condition that a detector detects that the document sheet has been placed on the document tray;

causing a conveyor to convey the document sheet based on the information about the thickness that is set by the displayed object;

using a reader to read an image of the document sheet conveyed by the conveyor; and receiving a setting as to whether a screen for setting the thickness of the document sheet is to be displayed at the predetermined timing on condition that the detector detects that the document sheet has been placed.

* * * * *